(12) United States Patent
Shibata

(10) Patent No.: US 7,713,325 B2
(45) Date of Patent: May 11, 2010

(54) METHOD FOR MANUFACTURING HONEYCOMB FILTER FOR PURIFYING EXHAUST GASES

(75) Inventor: Toshiaki Shibata, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

(21) Appl. No.: 12/033,417

(22) Filed: Feb. 19, 2008

(65) Prior Publication Data

US 2008/0213485 A1 Sep. 4, 2008

Related U.S. Application Data

(63) Continuation of application No. 10/508,415, filed as application No. PCT/JP03/03495 on Mar. 24, 2003, now abandoned.

(30) Foreign Application Priority Data

Mar. 22, 2002 (JP) .............................. 2002-081237

(51) Int. Cl.
- B01D 39/06 (2006.01)
- B01D 39/00 (2006.01)
- B01D 39/14 (2006.01)
- B01D 50/00 (2006.01)
- B01J 23/00 (2006.01)

(52) U.S. Cl. .............................. 55/523; 55/522; 55/524; 422/177; 422/178; 422/179; 422/180; 422/181; 422/182; 502/303

(58) Field of Classification Search ........... 55/522–524; 422/177–182; 502/303
See application file for complete search history.

(56) References Cited

U.S. PATENT DOCUMENTS

| | | | |
|---|---|---|---|
| 4,329,162 A | 5/1982 | Pitcher, Jr. | |
| 4,353,854 A | 10/1982 | Oyamada et al. | |
| 4,595,662 A | 6/1986 | Mochida et al. | |
| 4,953,627 A * | 9/1990 | Ito et al. | 165/8 |
| 5,885,923 A * | 3/1999 | Yoshida et al. | 502/312 |
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,396,586 B2 | 7/2008 | Ohno et al. | |
| 7,491,057 B2 | 2/2009 | Saijo et al. | |
| 7,498,544 B2 | 3/2009 | Saijo et al. | |

(Continued)

FOREIGN PATENT DOCUMENTS

EP 0 283 224 A1 9/1988

(Continued)

OTHER PUBLICATIONS

U.S. Appl. No. 11/760,037, Ninomiya et al.

(Continued)

Primary Examiner—Walter D Griffin
Assistant Examiner—Amber Orlando
(74) Attorney, Agent, or Firm—Oblon, Spivak, McClelland, Maier & Neustadt, L.L.P.

(57) ABSTRACT

A method for manufacturing a honeycomb filter for purifying exhaust gas, including: providing a columnar body including porous ceramic and having a wall portion and through holes partitioned by the wall portion, the through holes extending in a length direction of the columnar body, coating a sealing material including one or more organic components over a circumferential surface of the columnar body to form a sealing material layer; and heating the columnar body having the sealing material layer on the circumferential surface of the columnar body at a temperature sufficient to lower a total weight of the organic component with respect to a total weight of the honeycomb filter, $V\alpha$.

20 Claims, 8 Drawing Sheets

U.S. PATENT DOCUMENTS

| | | | |
|---|---|---|---|
| 2002/0197193 A1* | 12/2002 | Harada et al. | 422/177 |
| 2004/0161596 A1 | 8/2004 | Taoka et al. | |
| 2005/0011174 A1 | 1/2005 | Hong et al. | |
| 2005/0076626 A1 | 4/2005 | Kudo et al. | |
| 2005/0109023 A1 | 5/2005 | Kudo et al. | |
| 2005/0153099 A1 | 7/2005 | Yamada | |
| 2005/0160710 A1 | 7/2005 | Taoka et al. | |
| 2005/0161849 A1 | 7/2005 | Ohno et al. | |
| 2005/0169819 A1 | 8/2005 | Shibata | |
| 2005/0175514 A1 | 8/2005 | Ohno | |
| 2005/0180898 A1 | 8/2005 | Yamada | |
| 2005/0247038 A1 | 11/2005 | Takahashi | |
| 2005/0272602 A1 | 12/2005 | Ninomiya | |
| 2006/0021310 A1 | 2/2006 | Ohno et al. | |
| 2006/0029898 A1 | 2/2006 | Saijo et al. | |
| 2006/0043652 A1 | 3/2006 | Saijo et al. | |
| 2006/0051556 A1 | 3/2006 | Ohno et al. | |
| 2006/0073970 A1 | 4/2006 | Yamada | |
| 2006/0108347 A1 | 5/2006 | Koyama et al. | |
| 2006/0118546 A1 | 6/2006 | Saijo | |
| 2006/0166820 A1 | 7/2006 | Ogyu et al. | |
| 2006/0210765 A1 | 9/2006 | Ohno et al. | |
| 2006/0213163 A1 | 9/2006 | Taoka et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228521 A1 | 10/2006 | Ohno et al. | |
| 2006/0230732 A1 | 10/2006 | Kunieda | |
| 2006/0269722 A1 | 11/2006 | Yamada | |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0065348 A1 | 3/2007 | Ohno et al. | |
| 2007/0068128 A1 | 3/2007 | Oshimi et al. | |
| 2007/0085233 A1 | 4/2007 | Yamada | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0144561 A1 | 6/2007 | Saijo et al. | |
| 2007/0148403 A1 | 6/2007 | Yamamura et al. | |
| 2007/0152382 A1 | 7/2007 | Yamada et al. | |
| 2007/0169453 A1 | 7/2007 | Hayakawa | |
| 2007/0175060 A1 | 8/2007 | Idei et al. | |
| 2007/0178275 A1 | 8/2007 | Takahashi | |
| 2007/0187651 A1 | 8/2007 | Naruse et al. | |
| 2007/0190289 A1 | 8/2007 | Fujita | |
| 2007/0190350 A1 | 8/2007 | Ohno et al. | |
| 2007/0196620 A1 | 8/2007 | Ohno et al. | |
| 2007/0199205 A1 | 8/2007 | Hoshino et al. | |
| 2007/0199643 A1 | 8/2007 | Kawai et al. | |
| 2007/0204580 A1 | 9/2007 | Kunieda | |
| 2007/0212517 A1 | 9/2007 | Ohno et al. | |
| 2007/0235895 A1 | 10/2007 | Yamamura et al. | |
| 2007/0243283 A1 | 10/2007 | Yamamura et al. | |
| 2007/0262497 A1 | 11/2007 | Yamamura et al. | |
| 2007/0262498 A1 | 11/2007 | Saijo et al. | |
| 2007/0277655 A1 | 12/2007 | Kawai et al. | |
| 2007/0293392 A1 | 12/2007 | Ohno et al. | |
| 2008/0006971 A1 | 1/2008 | Kawai et al. | |
| 2008/0067725 A1 | 3/2008 | Naruse et al. | |
| 2008/0083202 A1 | 4/2008 | Kunieda et al. | |
| 2008/0084010 A1 | 4/2008 | Naruse et al. | |
| 2008/0088072 A1 | 4/2008 | Kobayashi | |
| 2008/0106008 A1 | 5/2008 | Kasai et al. | |
| 2008/0106009 A1 | 5/2008 | Naruse et al. | |
| 2008/0111274 A1 | 5/2008 | Kawai et al. | |
| 2008/0115597 A1 | 5/2008 | Ohno et al. | |
| 2008/0116200 A1 | 5/2008 | Kawai et al. | |
| 2008/0116601 A1 | 5/2008 | Naruse et al. | |
| 2008/0120950 A1 | 5/2008 | Ohno et al. | |
| 2008/0136053 A1 | 6/2008 | Kuribayashi et al. | |
| 2008/0136062 A1 | 6/2008 | Kasai et al. | |
| 2008/0150200 A1 | 6/2008 | Tajima | |
| 2008/0157445 A1 | 7/2008 | Kawai et al. | |
| 2008/0160249 A1 | 7/2008 | Makino | |
| 2008/0174039 A1 | 7/2008 | Saijo et al. | |
| 2008/0179781 A1 | 7/2008 | Iwata | |
| 2008/0197544 A1 | 8/2008 | Saijo et al. | |
| 2008/0211127 A1 | 9/2008 | Naruse et al. | |
| 2008/0213485 A1 | 9/2008 | Shibata | |
| 2008/0236115 A1 | 10/2008 | Sakashita | |
| 2008/0236724 A1 | 10/2008 | Higuchi | |
| 2008/0237428 A1 | 10/2008 | Kobayashi et al. | |
| 2008/0237942 A1 | 10/2008 | Takamatsu | |
| 2008/0241015 A1 | 10/2008 | Kudo et al. | |
| 2008/0251977 A1 | 10/2008 | Naruse et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |
| 2009/0079111 A1 | 3/2009 | Kasai et al. | |
| 2009/0107879 A1 | 4/2009 | Otsuka et al. | |
| 2009/0130378 A1 | 5/2009 | Imaeda et al. | |

FOREIGN PATENT DOCUMENTS

| | | | |
|---|---|---|---|
| EP | 0 449 556 A2 | | 10/1991 |
| EP | 0 965 735 A2 | | 12/1999 |
| EP | 1 138 389 A1 | | 10/2001 |
| EP | 1 142 619 A1 | | 10/2001 |
| EP | 1 174 399 A1 | | 1/2002 |
| EP | 1 291 061 A1 | | 3/2003 |
| EP | 1 479 882 A1 | | 11/2004 |
| JP | 07-000183 | | 1/1995 |
| JP | 2000-220448 | | 8/2000 |
| JP | 2001-162121 | | 6/2001 |
| JP | 2001-289028 | | 10/2001 |
| JP | 2002-028644 | | 2/2002 |
| JP | 2002-070545 | | 3/2002 |
| WO | WO0123069 | * | 4/2001 |
| WO | WO 01/53232 A1 | | 7/2001 |
| WO | WO0151173 | * | 7/2001 |
| WO | 01/71170 | | 9/2001 |
| WO | WO 01/93984 A1 | | 12/2001 |

OTHER PUBLICATIONS

U.S. Appl. No. 11/874,790, Oshimi.
U.S. Appl. No. 11/851,300, Oshimi.
U.S. Appl. No. 11/925,459, Ito.
U.S. Appl. No. 11/932,469, Oshimi.
U.S. Appl. No. 11/927,225, Saito et al.
Japanese Industrial Standard JIS R 1618 (2002)-Measuring method of thermal expansion of fine ceramics by thermomechanical analysis (in Japanese and English translation) 20 pages.
U.S. Appl. No. 12/363,396, Sato.
U.S. Appl. No. 12/369,876, Sato.
U.S. Appl. No. 12/334,226, Mizuno et al.
U.S. Appl. No. 12/400,389, Higuchi.
U.S. Appl. No. 12/342,903, Ohno.
U.S. Appl. No. 12/393,200, Saijo.
U.S. Appl. No. 12/411,148, Hiroshima.
"Plastics—Thermogravimetry of polymers—Temperature scanning method", International Standard, 1987, 4 pages.
"Handbook of Ceramics", [2$^{nd}$ edition], published on Mar. 31, 2002, 5 pages, (plus partial English translation).
Taku Harada, "Removal of the Binder", (Expiriment Technology Lectures on Ceramics), No. 10, 1997, pp. 856-859, (with English translation).
cited non-patent document, http://ec.europa.eu./enterprise/automotive/directives/vehicles/dir70_220_cee.html, A8, 4 pages.

* cited by examiner (a)

(b)

Cross-sectional view taken along line A-A

Cross-sectional view taken along line B-B

METHOD FOR MANUFACTURING HONEYCOMB FILTER FOR PURIFYING EXHAUST GASES

CROSS REFERENCE TO RELATED APPLICATION

This application is a continuation of and claims the benefit of priority under 35 U.S.C. §120 from U.S. Ser. No. 10/508,415, filed Mar. 24, 2005, which is a national stage of International Application No. PCT/JP03/03495, filed Mar. 24, 2003, and further claims the benefit of priority under 35 U.S.C. §119 from Japanese Patent Application No. 2002-81237, filed on Mar. 22, 2002, the entire contents of those applications are incorporated herein by reference.

TECHNICAL FIELD

The present invention relates to a honeycomb filter for purifying exhaust gases that is used as a filter for removing particulates and the like contained in exhaust gases discharged from an internal combustion engine such as a diesel engine or the like.

BACKGROUND ART

In recent years, particulates contained in exhaust gases that are discharged from internal combustion engines of vehicles, such as buses, trucks and the like, and construction machines have raised serious problems since those particulates are harmful to the environment and the human body.

For this reason, there have been proposed various ceramic filters that allow exhaust gases to pass through porous ceramics and collect particulates in the exhaust gases to purify the exhaust gases.

With respect to the ceramic filter of this type, conventionally, as indicated by a honeycomb filter 10 in FIG. 1, there have been proposed those having a structure in that a sealing material layer 14 is formed on a circumference of a columnar body 15 made of cordierite or the like, which has a number of through holes 11 placed in parallel with one another in the length direction with wall portion 13 interposed there between. In this honeycomb filter 10, wall portion 13 that separates the through holes 11 from each other functions as a filter (for example, see J UM Kokai Hei 7-183).

In other words, the columnar body 15 is constituted by a single sintered body, and as shown in FIG. 1(b), each of the through holes 11 formed in the columnar body 15 is sealed with a plug 12 at either of ends of its exhaust gas inlet side and outlet side, so that exhaust gases that have entered one through hole 11 are discharged from another through hole 11 after having always passed through wall portion 13 that separates the through holes 11 from each other.

Here, the sealing material layer 14 is formed in order to reinforce the circumference of the columnar body 15 or improve the heat-insulating property of the honeycomb filter 10.

Moreover, in recent years, in place of the above-mentioned honeycomb filter made of cordierite, honeycomb filters, made of a porous silicon carbide sintered material, have often been used because this material has advantages such as superior heat resistance, mechanical strength, collecting efficiency and the like, as well as chemical stability and a small pressure loss.

With respect to the honeycomb filter made of the porous silicon carbide sintered material, as indicated by a honeycomb filter 20 shown in FIG. 2, a honeycomb filter having the following structure has been proposed: a plurality of porous ceramic members 30 made of silicon carbide are combined with one another through sealing material layers 23 to form a ceramic block 25, and a sealing material layer 24 is formed on the circumference of this ceramic block 25 (for example, see JP Kokai 2001-162121). Moreover, as shown in FIG. 3, each porous ceramic member 30 has a structure in that: a number of through holes 31 are placed in parallel with one another in the length direction; and partition wall 33 that separates the through holes 31 from each other functions as a filter.

In other words, as shown in FIG. 3 (b), each of the through holes 31 formed in the porous ceramic member 30 is sealed with a plug 32 at either of ends of its exhaust gas inlet side or outlet side, so that exhaust gases that have entered one through hole 31 are discharged from another through hole 31 after having always passed through partition wall 33 that separates the through holes 31 from each other.

Here, the sealing material layer 24 is provided so as to prevent exhaust gases from leaking through the circumference of each ceramic block 25 when the honeycomb filter 20 is installed in an exhaust passage of an internal combustion engine.

The honeycomb filter 10 or the honeycomb filter 20 having the above-mentioned structure is installed in the exhaust passage in the internal combustion engine, so that particulates in the exhaust gases discharged from the internal combustion engine are captured by the wall portion 13 or the partition wall 33 when passing through the honeycomb filter; thus, the exhaust gases are purified.

In particular, since the honeycomb filter 20 shown in FIG. 2 has superior heat resistance and provides easy regenerating processes and the like, it has been applied to various large-size vehicles and vehicles with diesel engines.

In this arrangement, however, since the sealing material layer of the conventional honeycomb filter contains a comparatively large amount of organic components, in the case of a honeycomb filter in which sealing material layers account for a great ratio, it contains a large amount of organic components.

Moreover, the sealing material layer is not made into a completely dense body, and exhaust gases are slightly allowed to flow into the layer. For this reason, in the case where such a honeycomb filter, which has sealing material layers containing a large amount of organic components as described above, is installed in an exhaust passage in a vehicle such as a large-size vehicle, a vehicle having a diesel engine and the like, and used therein, the organic components are discharged outside through exhaust gases that is flown into the sealing material layer, resulting in a great increase in the amount of the organic components (HC) of exhaust gases.

Moreover, there have been also proposed honeycomb filters which support a catalyst in order to decompose and eliminate organic components in exhaust gases to be discharged outside. However, conventional honeycomb filters have failed to sufficiently decompose and eliminate the organic components by using the above-mentioned catalyst.

SUMMARY OF THE INVENTION

The present invention is made to solve the above problems, and its object is to provide a honeycomb filter for purifying exhaust gases having a structure in that, even when comparatively large sealing material layer is included therein, there is hardly any increase in the amount of organic components contained in exhaust gases to be discharged.

According to a first aspect of the present invention, a honeycomb filter for purifying exhaust gases has a structure in which: a columnar body made of porous ceramic comprises a number of through holes, the above mentioned through holes being placed in parallel with one another in the length direction with wall portion interposed there between; a sealing material layer is formed on a circumference portion of the above mentioned columnar body; and the above mentioned wall portion which separates the above mentioned through holes functions as a filter for collecting particulates wherein a rate Sα of an area occupied by the sealing material layers to the total area of across-section including the through holes in the direction perpendicular to the through holes, in the above mentioned honeycomb filter for purifying exhaust gases, is set to 0.5% or more, and a rate Vα of organic components to the honeycomb filter for purifying exhaust gases is set to 0.5% by weight or less.

Moreover, according to a second aspect of the present invention, a honeycomb filter for purifying exhaust gases has a structure in which: a plurality of a columnar porous ceramic member are combined with one another through a sealing material layer to form a ceramic block, each of the above mentioned columnar porous ceramic member comprising a number of through holes, the above mentioned through holes being placed in parallel with one another in the length direction with partition wall interposed there between; a sealing material layer is formed on a circumference portion of the above mentioned ceramic block; and the above mentioned partition wall which separates the above mentioned through holes functions as a filter for collecting particulates, wherein a rate Sβ of an area occupied by the sealing material layers to the total area of a cross-section including the through holes in the direction perpendicular to the through holes, in the above mentioned honeycomb filter for purifying exhaust gases, is set to 2% or more, and a rate Vβ of organic components to the above mentioned honeycomb filter for purifying exhaust gases is set to 0.5% by weight or less.

In the following description, the honeycomb filter for purifying exhaust gases according to the first aspect of the present invention is simply referred to as the honeycomb filter according to the first aspect of the present invention, and the honeycomb filter for purifying exhaust gases according to the second aspect of the present invention is simply referred to as the honeycomb filter according to the second aspect of the present invention. When the two are not particularly distinguished, each of these is also simply referred to as the honeycomb filter of the present invention.

EXPLANATION OF SYMBOLS

| | |
|---|---|
| 10, 20 | honeycomb filter for purifying exhaust gases |
| 11, 31 | through hole |
| 12, 32 | plug |
| 13 | wall portion |
| 14, 23, 24 | sealing material layer |
| 25 | ceramic block |
| 30 | porous ceramic member |
| 33 | partition wall |

DETAILED DISCLOSURE OF THE INVENTION

First, the description will be given of the honeycomb filter according to the first aspect of the present invention.

A honeycomb filter according to the first aspect of the present invention has a structure in which: a columnar body made of porous ceramic comprises a number of through holes, the above mentioned through holes being placed in parallel with one another in the length direction with wall portion interposed there between; a sealing material layer is formed on a circumference portion of the above mentioned columnar body; and the above mentioned wall portion which separates the above mentioned through holes functions as a filter for collecting particulates wherein a rate Sα of an area occupied by the sealing material layers to the total area of a cross-section including the through holes in the direction perpendicular to the through holes, in the above mentioned honeycomb filter for purifying exhaust gases, is set to 0.5% or more, and a rate Vα of organic components to the honeycomb filter for purifying exhaust gases is set to 0.5% by weight or less.

Figure 1:
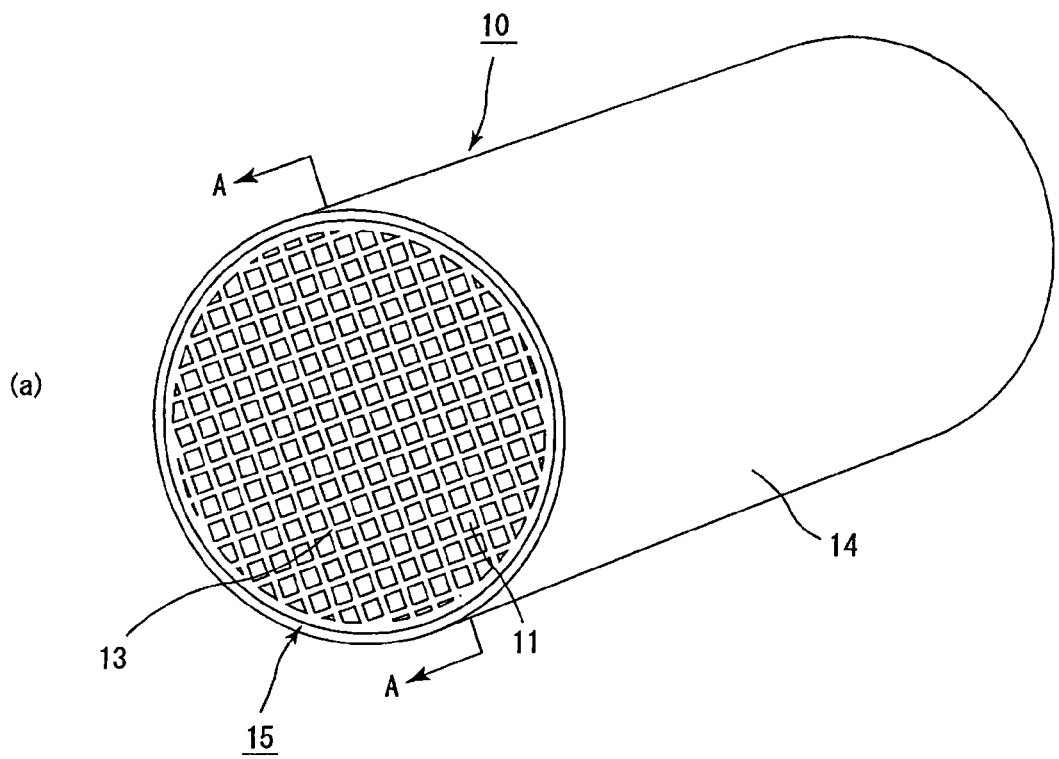
FIG. 1(a) is a perspective view that schematically shows one example of a honeycomb filter for purifying exhaust gases according to the first aspect of the present invention.
FIG. 1(b) is a longitudinal cross-sectional view taken along line A-A of FIG. 1(a).
Figure 1:
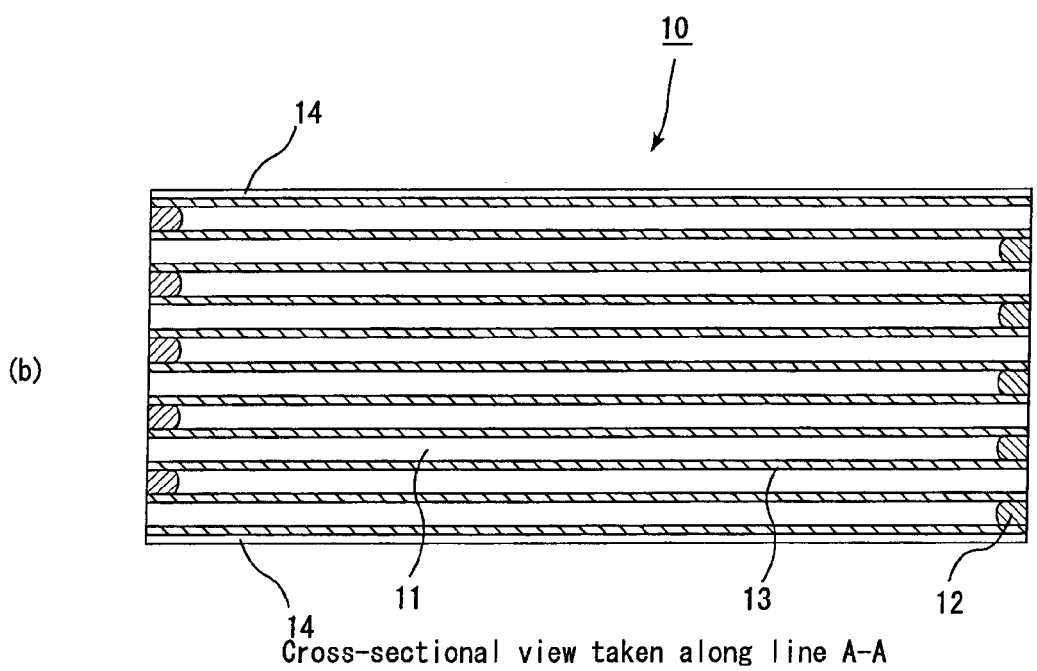

With respect to the shape of the honeycomb filter according to the first aspect of the present invention, for example, a honeycomb filter having almost the same shape as that of the honeycomb filter 10 shown in FIG. 1 is proposed, and a sealing material layer is formed on a circumference of a columnar body comprising a number of through holes, the above mentioned through holes being placed in parallel with one another in the length direction with wall portion interposed there between. Here, wall portion that separates the through holes from each other functions as a filter for collecting particles.

In other words, each of the through holes formed in the columnar body has either of its ends on the inlet side and outlet side of exhaust gases sealed with a plug; thus, exhaust gases that have entered one of the through holes are allowed to discharge from another through hole after always passing through the wall portion that separates the corresponding through holes from each other.

Here, the sealing material layer is provided in order to reinforce the circumference portion of the columnar body or improve the heat-insulating property of the honeycomb filter according to the first aspect of the present invention.

Not limited to a cylinder shape as shown in FIG. 1, the honeycomb filter according to the first aspect of the present invention may have an optional shape such as an elliptical column shape, a rectangular column shape and the like.

In the honeycomb filter according to the first aspect of the present invention, the sealing material layer is formed on only the circumference of the columnar body, and the rate $S\alpha$ of the area occupied by the sealing material layers to the total area of a cross-section including the through holes in the direction perpendicular to the through holes is set to 0.5% or more. In other words, the honeycomb filter according to the first aspect of the present invention contains comparatively large sealing material layer.

Here, for example, supposing that the radius of a circle constituted by the sealing material layer 14 and the columnar body 15 on the end face of the cylinder-shaped honeycomb filter 10, for example, shown in FIG. 1, is represented by r, the above-mentioned rate $S\alpha$ is defined by $(S2/S1)\times 100$ based upon the area S1 represented by $\pi r^2$ and the area S2 of the sealing material layer 14 on the above-mentioned end face.

When the $S\alpha$ is less than 0.5%, the sealing material layer existing on the cross section including the through holes in the direction perpendicular to the through holes of the honeycomb filter becomes very thin, making it difficult for exhaust gases to flow into the sealing material layer. For this reason, even in the case where a large amount of organic components, that is, the rate $V\alpha$ exceeding 0.5% by weight of the organic components to the honeycomb filter that will be described later, is contained, the organic components are hardly discharged outside, with the result that the increase in the amount of organic components in the exhaust gases to be discharged outside upon using the honeycomb filter becomes smaller. However, in the case of the rate $S\alpha$ of less than 0.5%, the area of the sealing material layer becomes so small that the isostatic strength of the honeycomb filter (isotropic pressure breaking strength) becomes insufficient.

Moreover, with respect to the honeycomb filter according to the first aspect of the present invention, the rate $V\alpha$ of the organic components is set to 0.5% by weight or less.

Here, supposing that the total weight of the honeycomb filter according to the first aspect of the present invention is V1 and that the total weight of the organic components contained in the honeycomb filter is V2, the $V\alpha$ is defined as $(V2/V1)\times 100$.

When the rate $V\alpha$ exceeds 0.5% by weight, the organic components contained in the honeycomb filter becomes greater, and in the case where the honeycomb filter according to the first aspect of the present invention that contains comparatively large sealing material layer having the rate $S\alpha$ exceeding 0.5%, is used, there is a great increase in the amount of organic components in exhaust gases to be discharged outside.

Moreover, the rate $V\alpha$ of the organic components to the honeycomb filter according to the first aspect of the present invention is desirably set to 0.1% by weight or less. This is because: in the case where a honeycomb filter according to the first aspect of the present invention having comparatively large sealing material layer is used, it becomes possible to further reduce the amount of organic components in exhaust gases to be discharged outside; furthermore, in the case where the honeycomb filter according to the first aspect of the present invention is allowed to support a catalyst which is capable of decomposing and eliminating the organic components in the exhaust gases, it is possible to prevent the deterioration of the sealing property of the sealing material layer, which occurs because of the fact that, upon applying the catalyst thereto, the organic components contained in the sealing material layer absorbs a slurry containing the catalyst to cause an abrupt expansion or the like in the sealing material layer during a heating treatment for fixing the catalyst; and also, it is possible to prevent the organic components contained in the sealing material layer from permeating into the catalyst to intervene the catalyst function, thus, it becomes possible to purify more exhaust gases.

Thus, the method for setting the rate $V\alpha$ of the organic components to 0.5% by weight or less to the honeycomb filter according to the first aspect of the present invention is not particularly limited, and examples thereof include a method in which the material, the blending ratio and the like for the sealing material layer forming the honeycomb filter according to the first aspect of the present invention, which will be described later, are adjusted, and a method in which, after forming a honeycomb structural body containing a large amount of organic components, the honeycomb structural body is heated so that the above-mentioned organic components are decomposed and eliminated.

The material forming the sealing material layer is not particularly limited, and examples thereof include materials such as an inorganic binder, an organic binder, inorganic fibers, inorganic particles and the like.

Examples of the inorganic binder may include silica sol, alumina sol and the like. Each of these may be used alone or two or more kinds of these may be used in combination. Among the inorganic binders, silica sol is more desirably used.

Here, the lower limit of the content of the inorganic binder is desirably set to 1% by weight, more desirably 5% by weight on a solid component basis. In contrast, the upper limit of the content of the inorganic binder is desirably set to 30% by weight, more desirably 15% by weight, furthermore desirably 9% by weight on a solid component basis. The content of the inorganic binder of less than 1% by weight tends to cause a reduction in the adhering strength, while the content exceeding 30% by weight tends to cause a reduction in the thermal conductivity.

Examples of the organic binder may include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

Here, the lower limit of the content of the organic binder is desirably set to 0.1% by weight, more desirably 0.2% by weight, furthermore desirably 0.4% by weight on a solid component basis. In contrast, the upper limit of the content of the organic binder is desirably set to 5.0% by weight, more desirably 1.0% by weight, furthermore desirably 0.6% by weight on a solid component basis. The content of the organic binder of less than 0.1% by weight tends to cause a difficulty in suppressing migration of the sealing material layer, while the content exceeding 5.0% by weight tends to cause the rate Vα of the organic components to a honeycomb filter to be manufactured to exceed 0.5% by weight, depending on the thickness of the sealing material layer, with the result that a heating process needs to be carried out as a post-process upon manufacturing the honeycomb filter.

Examples of the inorganic fibers may include ceramic fibers such as silica-alumina, mullite, alumina, silica and the like. Each of these may be used alone or two or more kinds of these may be used in combination. Among the inorganic fibers, silica-alumina fibers are more desirably used.

Here, the lower limit of the content of the inorganic fibers is desirably set to 10% by weight, more desirably 20% by weight on a solid component basis. In contrast, the upper limit of the content of the inorganic fibers is desirably set to 70% by weight, more desirably 40% by weight, furthermore desirably 30% by weight on a solid component basis. The content of the inorganic fibers of less than 10% by weight tends to cause a reduction in elasticity, while the content exceeding 70% by weight tends to cause a reduction in thermal conductivity and degradation in effects as an elastic member.

Examples of the inorganic particles may include carbides, nitrides and the like, and specific examples may include inorganic powder or whiskers made of silicon carbide, silicon nitride and boron nitride. Each of these may be used alone, or two or more kinds of these may be used in combination. Among the inorganic fine particles, silicon carbide having superior thermal conductivity is desirably used.

Here, the lower limit of the content of the inorganic particles is desirably set to 3% by weight, more desirably 10% by weight, furthermore desirably 20% by weight on a solid component basis. In contrast, the upper limit of the content of the inorganic particles is desirably set to 80% by weight, more desirably 60% by weight, furthermore desirably 40% by weight on a solid component basis. The content of the inorganic particles of less than 3% by weight tends to cause a reduction in thermal conductivity, while the content exceeding 80% by weight tends to cause a reduction in adhering strength when the sealing material layer is exposed to high temperatures.

Here, the lower limit of the shot content of the inorganic fibers is desirably set to 1% by weight, and the upper limit thereof is desirably set to 10% by weight, more desirably 5% by weight, furthermore desirably 3% by weight. The lower limit of the fiber length is desirably set to 1 mm, and the upper limit thereof is desirably set to 100 mm, more desirably 50 mm, furthermore desirably 20 mm.

The shot content of less than 1% by weight is difficult to be achieved in the manufacturing, and the shot content exceeding 10% by weight tends to damage the circumference of the column body. Moreover, the fiber length of less than 1 mm makes it difficult to form a honeycomb filter having elasticity, and in contrast, the shot content exceeding 100 mm tends to form fibers into a pill shape, resulting in degradation in dispersion of inorganic particles and the subsequent difficulty in making the thickness of the sealing material layer thinner.

Here, the lower limit of the particle size of the inorganic particles is desirably set to 0.01 μm, more desirably 0.1 μm. In contrast, the upper limit of the particle size of the inorganic particles is desirably set to 100 μm, more desirably 15 μm, furthermore desirably 10 μm. The diameter of inorganic particles of less than 0.01 μm tends to cause high costs, and in contrast, the diameter of inorganic particles exceeding 100 μm tends to cause degradation in adhering strength and thermal conductivity.

Here, the organic components contained in the honeycomb filter according to the first aspect of the present invention specifically correspond to the organic binder, and the rate Vα of the organic binder to the honeycomb filter according to the first aspect of the present invention is set to 0.5% by weight or less.

Even in the case where a great amount of these organic components are contained in a honeycomb filter including comparatively large sealing material layer, the organic components are easily decomposed into $CO_2$ and $H_2O$ when heated in an atmosphere containing sufficient oxygen, and hardly cause toxic gases. However, since the honeycomb filter for purifying exhaust gases is installed at a portion exposed to exhaust gases that contain little oxygen and are discharged from an engine, the organic components are not completely decomposed, and tend to be discharged as hydrocarbons such as methane, ethane, ethylene, propylene and the like and toxic gases such as CO, $NO_x$ and the like, resulting in serious problems.

In the honeycomb filter according to the first aspect of the present invention, however, even though the honeycomb filter includes comparatively large sealing material layer, since the amount of organic components contained therein is extremely small so that, upon actually using the honeycomb filter according to the first aspect of the present invention, there is hardly any increase in the amount of hydrocarbons and toxic gases such as CO, $NO_x$ and the like contained in exhaust gases to be discharged outside, making it possible to eliminate problems caused by the organic components contained in the honeycomb filter.

The material for the columnar body made of porous ceramics is not particularly limited, and examples thereof may include nitride ceramics such as aluminum nitride, silicon nitride, boron nitride, titanium nitride and the like, carbide ceramics such as silicon carbide, zirconium carbide, titanium carbide, tantalum carbide, tungsten carbide and the like, and oxide ceramics such as alumina, zirconia, cordierite, mullite and the like. Normally, oxide carbide such as cordierite and the like is used. This is because: this material allows low manufacturing costs, has a comparatively small thermal expansion coefficient, and is less susceptible to oxidation in use. Here, silicon-containing ceramics in which metallic silicon is blended in the above-mentioned ceramics and ceramics that are combined by silicon and a silicate compound may be used.

The average pore diameter of the honeycomb filter according to the first aspect of the present invention is desirably set in a range from 5 to 100 μm. The average pore diameter of less than 5 μm tends to cause clogging of particulates easily. In contrast, the average pore diameter exceeding 100 μm tends to cause particulates to pass through the pores, with the result that the particulates cannot be collected, making the honeycomb filter unable to function as a filter.

Here, the above-mentioned pore diameter of the porous ceramic member can be measured through known methods such as a mercury press-in method, a measuring method using a scanning electronic microscope (SEM), and the like.

Although not particularly limited, the porosity of the honeycomb filter according to the first aspect of the present invention is desirably set in a range from 40 to 80%. When the porosity is less than 40%, the honeycomb filter is more susceptible to clogging, while the porosity exceeding 80% causes degradation in the strength of the columnar body, with the result that it might be easily broken.

Here, the above-mentioned porosity can be measured through known methods such as a mercury press-in method, Archimedes method, a measuring method using a scanning electronic microscope (SEM), and the like.

With respect to the particle size of ceramic particles to be used upon manufacturing the columnar body, although not particularly limited, those which are less susceptible to shrinkage in the succeeding sintering process are desirably used, and for example, those particles, prepared by combining 100 parts by weight of powder having an average particle size from 0.3 to 50 µm with 5 to 65 parts by weight of powder having an average particle size from 0.1 to 1.0 m, are desirably used. By mixing ceramic powders having the above-mentioned respective particle sizes at the above-mentioned blending ratio, it is possible to provide a columnar body made of porous ceramics.

Moreover, in the columnar body of the honeycomb filter according to the first aspect of the present invention desirably, a catalyst for purifying exhaust gases is supported inside the columnar body. When the catalyst for purifying exhaust gases is supported in the columnar body, the honeycomb filter according to the first aspect of the present invention can function as a filter capable of collecting particulates in exhaust gases and, also, function as a catalyst converter capable of purifying toxic components such as HC, CO, $NO_x$ and the like as well as HC and the like generated by organic components slightly contained in the honeycomb filter according to the first aspect of the present invention.

The catalyst to be supported on the honeycomb filter of the present invention is not particularly limited, and examples thereof may include noble metals such as platinum, palladium, rhodium and the like. Each of these noble metals may be used alone, or a plurality of these may be used in combination.

Here, the catalyst for purifying exhaust gases made of the above-mentioned noble metal forms a so-called oxidizing catalyst; however, with respect to the catalyst for purifying exhaust gases, not particularly limited to the noble metals, any optional material such as rare-earth metal, alkali metal, alkali earth metal and the like may be used, as long as it can purify toxic components such as CO, HC, $NO_x$ and the like in exhaust gases.

In this manner, when the catalyst for purifying exhaust gases is supported on the honeycomb filter according to the first aspect of the present invention, the toxic components, such as CO, HC, $NO_x$ and the like, contained in exhaust gases discharged from an internal combustion system such as an engine, are made in contact with the above-mentioned catalyst for purifying exhaust gases so that reactions, mainly indicated by the following reaction formulas (1) to (3), is promoted.

$$CO+(1/2)O_2 \rightarrow CO_2 \qquad (1)$$

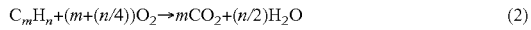

$$C_mH_n+(m+(n/4))O_2 \rightarrow mCO_2+(n/2)H_2O \qquad (2)$$

$$CO+NO \rightarrow (1/2)N_2+CO_2 \qquad (3)$$

Based upon the reaction formulas (1) and (2), CO and HC contained in exhaust gases are oxidized into $CO_2$ and $H_2O$. Based upon the reaction formula (3), $NO_x$ contained in exhaust gases is reduced by CO into $N_2$ and $CO_2$.

In other words, when the catalyst for purifying exhaust gases is supported on the honeycomb filter according to the first aspect of the present invention, the toxic components such as CO, HC, $NO_x$ and the like contained in exhaust gases are purified into $CO_2$, $H_2O$, $N_2$ and the like, and discharged outside.

As described above, the honeycomb filter according to the first aspect of the present invention has a rate Sα of 0.5% or more of the area occupied by the sealing material layers to the total area of a cross-section including the through holes in the direction perpendicular to the through holes, that is, comparatively large sealing material layer included therein; however, the rate Vα of organic components contained therein is set to 0.5% by weight or less that is a very low level so that, even when the honeycomb filter according to the first aspect of the present invention is installed in an exhaust passage of an internal combustion system such as an engine, and used, there is hardly any increase in the organic components in exhaust gases to be discharged.

Moreover, a catalyst for purifying exhaust gases may be supported on a columnar body of the honeycomb filter according to the first aspect of the present invention so that it is allowed to function as a filter for collecting particulates in exhaust gases, and also to function as a catalyst converter; thus, even in the case where organic components, slightly contained in the honeycomb filter according to the first aspect of the present invention, are discharged outside, these organic components are positively decomposed and purified by the catalyst for purifying exhaust gases.

Next, description will be given of the honeycomb filter according to the second aspect of the present invention.

A honeycomb filter for purifying exhaust gases according to the second aspect of the present invention has a structure in which:

a plurality of a rectangular columnar porous ceramic member are combined with one another through a sealing material layer to form a ceramic block, each of the above mentioned columnar porous ceramic member comprising a number of through holes, the above mentioned through holes being placed in parallel with one another in the length direction with partition wall interposed therebetween;

a sealing material layer is formed on a circumference portion of the above mentioned ceramic block; and the above mentioned partition wall which separates the above mentioned through holes functions as a filter for collecting particulates, wherein a rate Sβ of an area occupied by the sealing material layers to the total area of a cross-section including the through holes in the direction perpendicular to the through holes, in the above mentioned honeycomb filter for purifying exhaust gases, is set to 2% or more, and a rate Vβ of organic components to the above mentioned honeycomb filter for purifying exhaust gases is set to 0.5% by weight or less.

Figure 2:
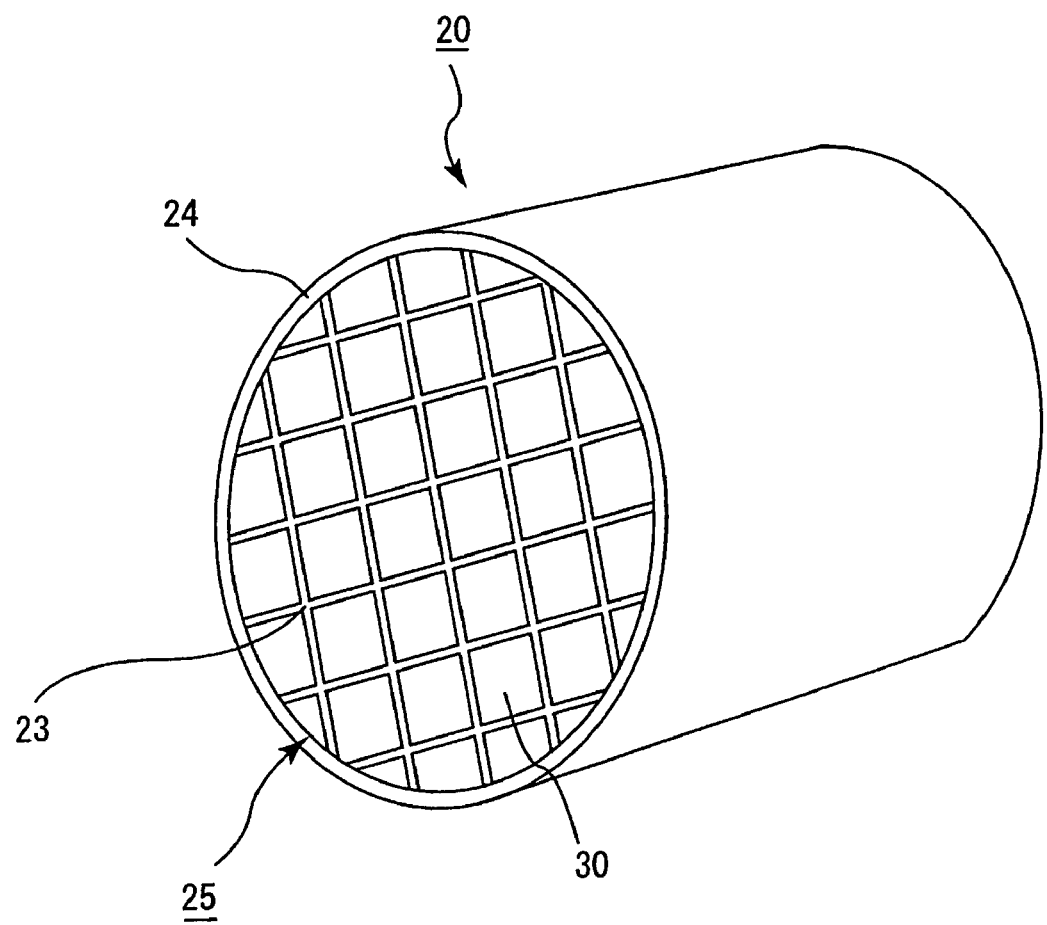
FIG. 2 is a perspective view that schematically shows one example of a honeycomb filter for purifying exhaust gases according to the second aspect of the present invention.

With respect to the shape of the honeycomb filter according to the second aspect of the present invention, for example, a honeycomb filter having almost the same shape as that of the honeycomb filter 20 shown in FIG. 2 is proposed, and a plurality of porous ceramic members are combined with one another through sealing material layers to form a ceramic block, and a sealing material layer is also formed on a circumference of the ceramic block. Moreover, each of the porous ceramic members has a number of through holes, the above mentioned through holes being placed in parallel with one another in the length direction with partition wall interposed there between so that the partition wall that separates the through holes from each other functions as filters.

In other words, each of the through holes formed in the porous ceramic member has either of its ends on the inlet side and outlet side of exhaust gases sealed with a plug; thus, exhaust gases that have entered one of the through holes are allowed to discharge from another through hole after always passing through the partition wall that separates the corresponding through holes.

Here, the sealing material layer, which is formed on the circumference of the ceramic block, is provided so as to prevent exhaust gases from leaking from the circumference portion of the ceramic block, when the honeycomb filter according to the second aspect of the present invention is installed in an exhaust passage of an internal combustion system.

Here, not limited to a cylinder shape as shown in FIG. 2, the honeycomb filter according to the second aspect of the present invention may have an optional shape such as an elliptical column shape, a rectangular column shape or the like.

In the honeycomb filter according to the second aspect of the present invention, the sealing material layer is formed between porous ceramic members as well as on the circumference of the ceramic block, and the rate $S\beta$ of the area occupied by the sealing material layers to the total area of a cross-section including the through holes in the direction perpendicular to the through holes is set to 2% or more. In other words, the honeycomb filter according to the second aspect of the present invention contains comparatively large sealing material layer.

Here, for example, supposing that the radius of a circle constituted by the sealing material layer 24 and the ceramic block 25 on the end face of the cylinder-shaped honeycomb filter 20, for example, shown in FIG. 2, is represented by r, the above-mentioned rate $S\beta$ is defined by $(S'2/S'1) \times 100$ based upon an area S'1 represented by $\pi r'^2$ and the area S'2 of the sealing material layer 23 and the sealing material layer 24 on the above-mentioned end face.

When the above-mentioned $S\beta$ is less than 2%, the sealing material layer existing on the cross-section including the through holes in the direction perpendicular to the through holes of the honeycomb filter becomes very thin, making it difficult for exhaust gases to flow into the sealing material layer. For this reason, even in the case where a large amount of organic components, that is, the rate $V\beta$ exceeding 0.5% by weight of the organic components to the honeycomb filter, is contained, the organic components are hardly discharged outside, with the result that the increase in the organic component amount in the exhaust gases to be discharged outside upon using the honeycomb filter becomes smaller. However, in the case of the rate $S\beta$ is less than 2%, the area of the sealing material layer becomes so small that the isostatic strength of the honeycomb filter (isotropic pressure breaking strength) becomes insufficient.

Here, the rate $V\beta$ of organic components to the honeycomb filter according to the second aspect of the present invention is set to 0.5% by weight or less.

Incidentally, with respect to the honeycomb filter according to the second aspect of the present invention, the above-mentioned rate $V\beta$ is defined as $(V'2/V'1) \times 100$, supposing that the total weight of the honeycomb filter according to the second aspect of the present invention is V'1, and that the total weight of the organic components contained in the honeycomb filter is V'2.

When the above-mentioned rate $V\beta$ exceeds 0.5% by weight, the organic components contained in the honeycomb filter becomes greater, and in the case where the honeycomb filter according to the second aspect of the present invention that contains comparatively large sealing material layer with the above-mentioned rate $S\beta$ exceeding 2%, is used, there is a great increase in the amount of organic components in exhaust gases to be discharged outside.

Moreover, the rate $V\beta$ of the organic components to the honeycomb filter according to the second aspect of the present invention is desirably set to 0.1% by weight or less.

This is because: in the case where a honeycomb filter according to the second aspect of the present invention having comparatively large sealing material layer is used, it becomes possible to further reduce the amount of organic components in exhaust gases to be discharged outside; furthermore, in the case where the honeycomb filter according to the first aspect of the present invention is allowed to support a catalyst capable of decomposing and eliminating the organic components in the exhaust gases, it is possible to prevent the deterioration of the sealing property of the sealing material layer, which occurs because of the fact that, upon applying the catalyst thereto, the organic components contained in the sealing material layer absorbs a slurry containing the catalyst to cause an abrupt expansion or the like in the sealing material layer during a heating treatment for fixing the catalyst; it is possible to prevent the organic components contained in the sealing material layer from permeating into the catalyst to intervene the catalyst function, thus, it becomes possible to purify more exhaust gases.

Thus, the method for setting the rate $V\beta$ of the organic components to 0.5% by weight or less to the honeycomb filter of the present invention is not particularly limited, and examples thereof include a method in which the material, the blending ratio and the like for the sealing material layer forming the honeycomb filter according to the second aspect of the present invention, which will be described later, are adjusted, and a method in which, after forming a honeycomb structural body containing a large amount of organic components, the honeycomb structural body is heated so that the above-mentioned organic components are decomposed and eliminated.

The material forming the sealing material layer is not particularly limited, and examples thereof may include materials such as an inorganic binder, an organic binder, inorganic fibers, inorganic particles and the like, which are the same materials as those described in the honeycomb filter according to the first aspect of the present invention.

Here, the organic components contained in the honeycomb filter according to the second aspect of the present invention specifically correspond to the above-mentioned organic binder, and the rate $V\beta$ of the organic binder to the honeycomb filter according to the second aspect of the present invention is set to 0.5% by weight or less.

Even in the case where a honeycomb filter that contains comparatively large sealing material layer is also allowed to contain many organic components, the organic components are easily decomposed into $CO_2$ and $H_2O$, when heated in an atmosphere containing sufficient oxygen, and hardly cause toxic gases. However, since the honeycomb filter for purifying exhaust gases is placed at a portion exposed to exhaust gases that contain little oxygen and are discharged from an engine, the organic components are not completely decomposed, and tend to be discharged as hydrocarbons such as methane, ethane, propylene and the like, and toxic gases such as $CO$, $NO_x$ and the like, resulting in serious problems.

In the honeycomb filter according to the second aspect of the present invention, however, even in the case where the honeycomb filter includes comparatively large sealing material layer, since the amount of organic components contained therein is extremely small so that, upon actually using the honeycomb filter according to the first aspect of the present invention, there is hardly any increase in the amount of hydrocarbons and toxic gases such as $CO$, $NO_x$ and the like contained in exhaust gases to be discharged outside, making it possible to eliminate problems caused by the organic components contained in the honeycomb filter.

The material for the porous ceramic member is not particularly limited, and examples thereof may include nitride ceramics, carbide ceramics and oxide ceramics that are the same materials as the columnar body described in the honeycomb filter according to the first aspect of the present invention. In particular, silicon carbide, which has high heat resistance, superior mechanical properties and high thermal conductivity, is desirably used. Here, silicon-containing ceramics in which metallic silicon is blended in the above-mentioned ceramics and ceramics that are combined by silicon and a silicate compound may be used.

The average pore diameter and the porosity of the porous ceramic member according to the second aspect of the present invention are not particularly limited, and the same average pore diameter and porosity as the honeycomb filter according to the first aspect of the present invention are desirably used, and with respect to the particle size of ceramics to be used upon manufacturing such a porous ceramic member, not particularly limited, the same particle size as the above-mentioned honeycomb filter according to the first aspect of the present invention is desirably used.

Moreover, a catalyst for purifying exhaust gases is desirably supported on the porous ceramic member of the honeycomb filter according to the second aspect of the present invention in the same manner as the honeycomb filter according to the first aspect of the present invention.

As described above, the honeycomb filter according to the second aspect of the present invention has a rate $S\beta$ of 2% or more of the area occupied by the sealing material layers to the total area of a cross-section including the through holes in the direction perpendicular to the through holes, that is, comparatively large sealing material layer included therein; however, the rate $V\beta$ of organic components contained therein is set to 0.5% by weight or less that is a very low level so that, even when the honeycomb filter according to the second aspect of the present invention is placed in an exhaust passage of an internal combustion system such as an engine, and used, there is hardly any increase in the organic components in exhaust gases to be discharged.

Moreover, a catalyst for purifying exhaust gases may be supported on a columnar body of the honeycomb filter according to the second aspect of the present invention so that it is allowed to function as a filter for collecting particulates in exhaust gases, and also to function as a catalyst converter; thus, even in the case where organic components, slightly contained in the honeycomb filter according to the second aspect of the present invention, are discharged outside, these organic components are positively decomposed and purified by the catalyst for purifying exhaust gases.

Referring to FIGS. 1 to 4, description will be given of one example of a manufacturing method for the above-mentioned honeycomb filter of the present invention.

First, the manufacturing method for the honeycomb filter according to the first aspect of the present invention will be described.

Upon manufacturing the honeycomb filter according to the first aspect of the present invention, a binder and a dispersant solution are added to the above-mentioned ceramics powder to prepare a material paste.

The binder is not particularly limited, and examples thereof may include methylcellulose, carboxy methylcellulose, hydroxyethylcellulose, polyethylene glycol, phenolic resin and epoxy resin.

The blended amount of the above-mentioned binder is desirably set to 1 to 10 parts by weight with respect to 100 parts by weight of ceramic powder.

The dispersant solution is not particularly limited, and examples thereof may include an organic solvent such as benzene; alcohol such as methanol; and water.

An appropriate amount of the above-mentioned dispersant solution is mixed therein so that the viscosity of the mixed composition is set within a fixed range.

These ceramic powder, binder and dispersant solution are mixed by an attritor or the like, and sufficiently kneaded by a kneader or the like, and then formed into a columnar ceramic formed body having almost the same shape as the columnar body 15 shown in FIG. 1 by using an extrusion-molding method or the like.

Here, a molding auxiliary may be added to the above-mentioned material paste, if necessary.

The molding auxiliary is not particularly limited, and examples thereof may include ethylene glycol, dextrin, fatty acid soap, polyalcohol and the like.

After the above-mentioned ceramic formed body has been dried by using a microwave drier or the like, a mouth-sealing process, which injects a sealant material (plug) to predetermined through holes, is carried out and this is again subjected to a drying process using a microwave drier or the like.

The sealant material (plug) is not particularly limited, and examples thereof may include the same material as the above-mentioned material paste.

Next, the formed body that has been subjected to the mouth-sealing process is subjected to degreasing and sintering processes under predetermined conditions so that a columnar body 15 made of porous ceramics is produced.

Next, a sealing material layer forming process for forming a sealing material layer 14 on the circumference of the columnar body 15 thus manufactured is carried out.

In this sealing material layer forming process, first, the columnar body 15 is rotated around an axis on which it is supported in the length direction.

Although not particularly limited, the rotational speed of the columnar body 15 is desirably set to 2 to 10 $\text{min}^{-1}$.

Successively, sealing material paste is allowed to adhere to the circumference of the rotating columnar body 15 to form a sealing material paste layer.

The sealing material paste is not particularly limited, and examples thereof may include the above-mentioned paste containing materials such as an inorganic binder, an organic binder, inorganic fibers, inorganic particles and the like.

Here, the above-mentioned sealing material paste may contain a slight amount of moisture, a solvent and the like; however, most of these moisture, solvent and the like are normally scattered during a heating process and the like that follow the applying process of the sealing material paste.

The sealing material paste may contain about 35 to 65% by weight of moisture and other solvents such as acetone, alcohol and the like with respect to the total weight in addition to the above-mentioned inorganic fibers, inorganic binder, organic binder and inorganic particles, in order to soften the sealing material paste and allow it to have proper fluidity so as to be easily applied, and the viscosity of the sealing material paste is desirably set to 15 to 25 Pa·s (10,000 to 20,000 cps (cP)).

Moreover, as described in the honeycomb filter according to the first aspect of the present invention, the honeycomb filter according to the first aspect of the present invention has a structure in that the rate $S\alpha$ of the area occupied by the sealing material layers to the total area of a cross-section including the through holes in the direction perpendicular to the through holes is set to 0.5% or more.

Therefore, the thickness of the sealing material paste layer needs to be adjusted in this sealing material layer forming process so that the rate Sα is set to 0.5% or more after the honeycomb filter has been manufactured.

As described in the honeycomb filter according to the first aspect of the present invention, the organic components contained in the honeycomb filter according to the first aspect of the present invention specifically correspond to the organic binder contained in the sealing material paste. For this reason, the materials constituting the sealing material paste, blended ratio thereof and the like are desirably adjusted so that the rate Vα of organic components contained in the finished honeycomb filter is set to 0.5% by weight or less.

Here, instead of preliminarily adjusting the materials of the sealing material paste, blended ratio thereof and the like, by carrying out a heating process under conditions of, for example, 500 to 700° C. for 10 to 90 minutes after the sealing material layer forming process, the organic components contained in the sealing material layer are decomposed and removed so that a honeycomb filter in which the rate Vα of organic components contained therein is set to 0.5% by weight or less may be formed.

Then, the sealing material paste layer, thus formed, is dried at a temperature of about 120° C. so that the moisture is evaporated to form a sealing material layer 14; thus, as shown in FIG. 1, the manufacturing process of the honeycomb filter 10 according to the first aspect of the present invention in which the sealing material layer 14 is formed on the circumference of the columnar body 15 is completed.

Next, the manufacturing method for the honeycomb filter according to the second aspect of the present invention will be described.

Upon manufacturing the honeycomb filter according to the second aspect of the present invention, first, a ceramic laminated body to become a ceramic block 25 is produced.

The ceramic laminated body has a columnar structure in that a plurality of rectangular columnar porous ceramic members 30 having a number of through holes 31 placed in parallel with one another in the length direction with partition wall 33 interposed there between are combined with one another through sealing material layers 23.

Upon manufacturing the porous ceramic member 30, first, a mixed composition is prepared by adding a binder and a dispersant solution to the aforementioned ceramic powder.

The method for preparing the above-mentioned mixed composition is not particularly limited, and the same method as that of the material paste as described in the manufacturing method for the honeycomb filter according to the first aspect of the present invention may be used.

Figure 3:
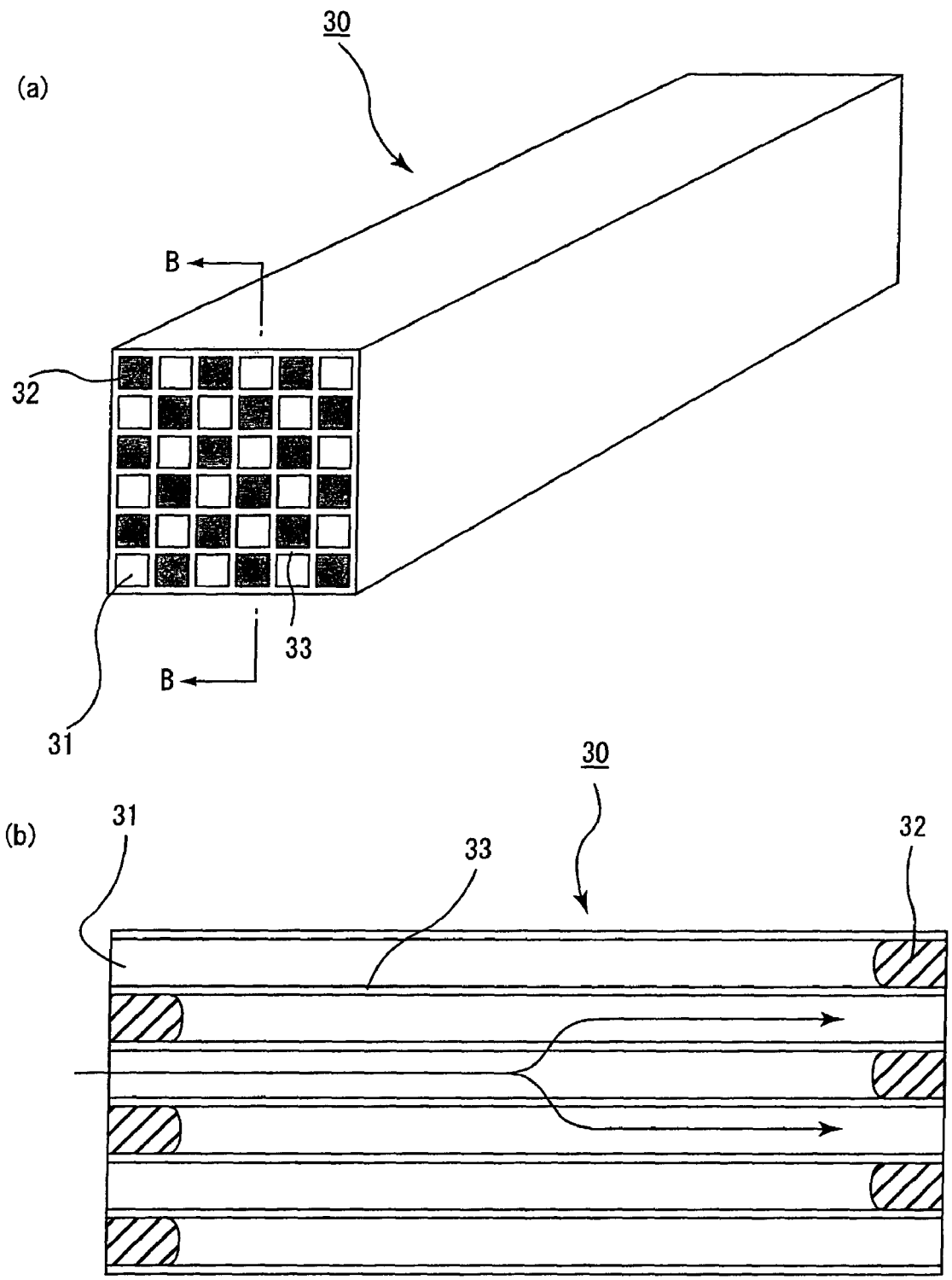
FIG. 3(a) is a perspective view that schematically shows a porous ceramic member to be used for the honeycomb filter according to the second aspect of the present invention shown in FIG. 2.
FIG. 3(b) is a longitudinal cross-sectional view taken along line B-B of FIG. 3(a).

Next, the above-mentioned mixed composition is mixed by an attritor or the like, and sufficiently kneaded by a kneader or the like and then formed into a columnar ceramic raw formed body having almost the same shape as the porous ceramic member 30 shown in FIG. 3 by using an extrusion-molding method or the like.

After the above-mentioned raw formed body has been dried by using a microwave drier or the like, a mouth-sealing process, which injects a sealant material (plug) to predetermined through holes, is carried out, and this is again subjected to a drying process using a microwave drier or the like.

The above-mentioned sealant material (plug) is not particularly limited and, for example, the same material as the above-mentioned mixed composition may be used.

Next, the raw formed body that has been subjected to the mouth-sealing process is subjected to a degreasing process by heating it to a temperature of 400 to 650° C. in an oxygen-containing atmosphere; thus, the binder and the like are vaporized, decomposed and eliminated so that almost only the ceramic powder is allowed to remain.

Next, the formed body that has been degreased is sintered by heating it at about 1400 to 2200° C. in an inert gas atmosphere such as nitrogen, argon and the like so that the ceramics powder is sintered to produce a porous ceramic member 30.

Figure 4:
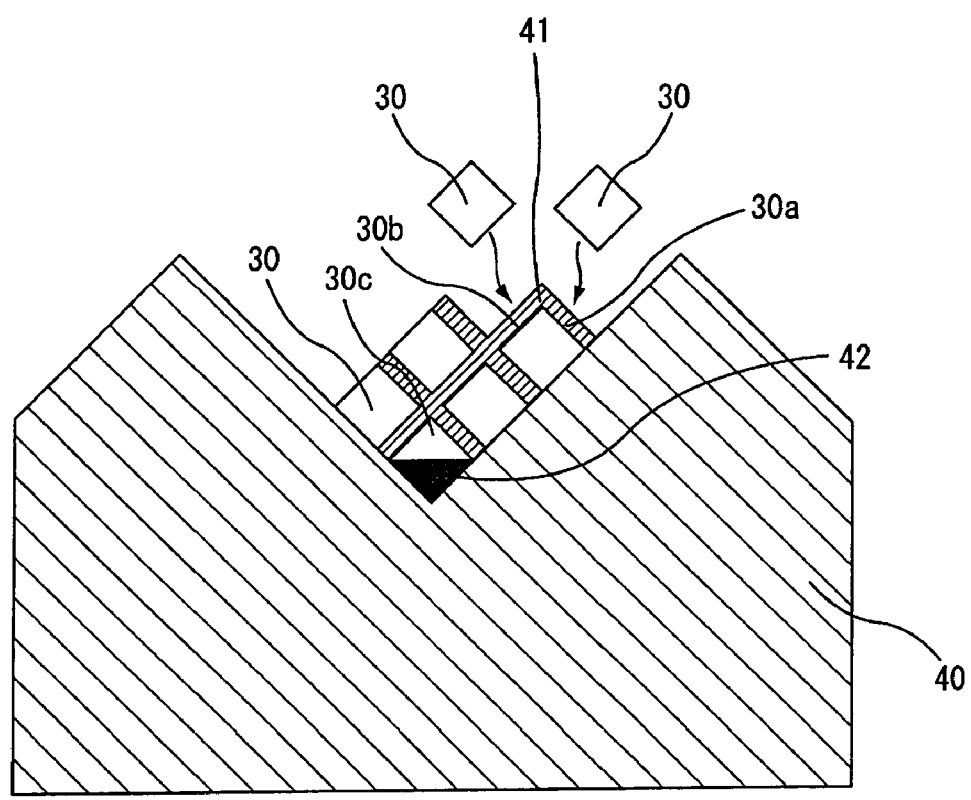
FIG. 4 is a side view that schematically shows a manufacturing process of the honeycomb filter according to the second aspect of the present invention.

Next, as shown in FIG. 4, upon manufacturing the ceramic laminated body, first, porous ceramic members 30 are placed on a base 40 the upper portion of which is designed to have a V-shape in its cross-section so as to allow the porous ceramic members 30 to be stacked thereon in a tilted manner, and sealing material paste to form a sealing material layer 23 is then applied onto two side faces 30a and 30b facing upward with an even thickness to form a paste layer 41; thereafter, a laminating process for forming another porous ceramic member 30 on this paste layer is successively repeated so that a columnar ceramic laminated body having a predetermined size is manufactured. At this time, with respect to the porous ceramic members 30 corresponding to four corners of the ceramic laminated body, a triangular columnar porous ceramic member 30c, which is formed by cutting a quadrangular columnar porous ceramic member into two, is bonded to a resin member 42 having the same shape as the triangular columnar porous ceramic member 30c by using a both-sides tape with easy peel ability to prepare a corner member, and these corner members are used for the four corners of the ceramic laminated body, and after the lamination processes of the porous ceramic members 30, all the resin members 42 forming the four corners of the ceramic laminated body are removed; thus, a ceramic laminated body having a polygonal column-shape in its cross section may be formed. With this arrangement, it is possible to reduce the quantity of a waste corresponding to porous ceramic members to be disposed of, after the formation of the ceramic block by cutting the circumference portion of the ceramic laminated body.

With respect to a method for manufacturing the ceramic laminated body having a polygonal column-shape in its cross section except for the method shown in FIG. 4, for example, a method in which the porous ceramic members to be located on four corners are omitted and a method in which porous ceramic members having a triangular column shape are combined with one another may be used in accordance with the shape of a honeycomb filter to be manufactured. Here, a quadrangular columnar ceramic member may of course be manufactured.

Further, this ceramic laminated body is heated in a temperature range from 50 to 100° C. for about 1 hour so that the paste layer is dried and solidified to form a sealing material layer 23; thereafter, by cutting the circumference portion thereof by using a diamond cutter or the like into a shape as shown in FIG. 2 so that a ceramic block 25 is formed.

With respect to the material for preparing the sealing material paste to form the sealing material layer 23, not particularly limited, for example, the same material as the sealing material paste described in the manufacturing method of the honeycomb filter according to the first aspect of the present invention may be used.

Next, a sealing material layer forming process for forming a sealing material layer 24 on the circumference of the columnar body 25 thus manufactured is carried out so that the manufacturing method for a honeycomb filter 20 according to the second aspect of the present invention with the sealing material layer 24 formed on the circumference of the ceramic block 25 is completed.

Here, with respect to this sealing material layer forming process, not particularly limited, for example, the same sealing material layer forming process as described in the manufacturing method of the honeycomb filter according to the first aspect of the present invention may be used.

Moreover, as described in the honeycomb filter according to the second aspect of the present invention, the honeycomb filter according to the second aspect of the present invention has a structure in that the rate Sβ of the area occupied by the sealing material layers to the total area of a cross-section including the through holes in the direction perpendicular to the through holes is set to 2% or more.

Therefore, upon forming the ceramic laminated body in the manufacturing method for the honeycomb filter according to the second aspect of the present invention, the thickness of the sealing material paste layer needs to be adjusted so that the above-mentioned rate Sβ is set to 2% or more after the honeycomb filter has been manufactured.

As described in the honeycomb filter according to the second aspect of the present invention, the organic components contained in the honeycomb filter according to the second aspect of the present invention specifically corresponds to the organic binder contained in the sealing material paste. For this reason, the materials constituting the sealing material paste, blended ratio thereof and the like are desirably adjusted so that the rate Vβ of organic components contained in the finished honeycomb filter is set to 0.5% by weight or less.

Here, instead of preliminarily adjusting the materials of the sealing material paste, blended ratio thereof and the like, by carrying out a heating process under conditions of, for example, 500 to 700° C. for 10 to 90 minutes after the sealing material layer forming process, the organic components contained in the sealing material layer are decomposed and removed so that a honeycomb filter in which the rate Vβ of organic components is set to 0.5% by weight or less may be formed.

Moreover, a catalyst for purifying exhaust gases may be supported on the honeycomb filter of the present invention thus manufactured. The honeycomb filter of the present invention on which such a catalyst for purifying exhaust gases has been supported is allowed to function as a filter capable of collecting particulates in exhaust gases, and also to function as a catalyst converter capable of purifying toxic components such as HC, CO, $NO_x$ and the like as well as gases generated by organic components slightly contained in the honeycomb filter according to the first aspect of the present invention.

BEST MODE FOR CARRYING OUT THE PRESENT INVENTION

Hereinafter, description will be given of the present invention in detail by means of examples; however, the present invention is not intended to be limited by these examples.

Example 1

(1) Talc having an average particle size of 10 μm (40 parts by weight), kaolin having an average particle size of 9 μm (10 parts by weight), alumina having an average particle size of 9.5 μm (17 parts by weight), aluminum hydroxide having an average particle size of 5 μm (16 parts by weight), silica having an average particle size of 10 μm (15 parts by weight) and a molding auxiliary (ethylene glycol) (6 parts by weight) were added to 16 parts by weight of water, and mixed and kneaded to prepare a material paste.

Next, the above-mentioned material paste was loaded into an extruder, and extruded at an extrusion rate of 10 cm/min so that a ceramic formed body having almost the same shape as the honeycomb filter 10 shown in FIG. 1 was formed, and the ceramic formed body was dried by a microwave drier, and predetermined through holes were then filled with a paste having the same composition as the material paste, and after this had been again dried by using a drier, this was degreased at 400° C., and sintered at 1400° C. in a normal-pressure argon atmosphere for 3 hours so that a columnar body comprising a cylinder shape, made of cordierite, was manufactured, as shown in FIG. 1.

(2) A heat resistant sealing material paste, which was composed of 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, was used to form a sealing material paste layer on the circumference of the columnar body.

Then, by drying this sealing material paste layer at 120° C. to form a sealing material layer, a cylinder-shaped honeycomb structural body having a thickness of sealing material layer of 0.5 mm and a diameter of an end face of 143.8 mm, as shown in FIG. 1, was manufactured.

In the honeycomb structural body thus manufactured, the rate of the area occupied by the sealing material layers to the total area of a cross-section including the through holes in the direction perpendicular to the through holes was 1.4%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure in that the rate Sα of the area occupied by the sealing material layers to the total area of a cross-section including the through holes in the direction perpendicular to the through holes was 1.4%, with the rate Vα of organic components being set to 0.05% by weight, was manufactured.

Example 2

First, the same processes as those of (1) and (2) of Example 1 were carried out to produce a honeycomb structural body.

Then, the above-mentioned honeycomb structural body was heated at 600° C. in an oxygen atmosphere for 60 minutes so that a honeycomb filter having a structure in that the rate Sα of the area occupied by the sealing material layers to the total area of a cross-section including the through holes in the direction perpendicular to the through holes was 1.4%, with the rate Vα of organic components being set to 0.10% by weight, was manufactured.

Example 3

First, the same processes as those of (1) and (2) of Example 1 were carried out to produce a honeycomb structural body.

Then, the above-mentioned honeycomb structural body was heated at 500° C. in an oxygen atmosphere for 30 minutes so that a honeycomb filter having a structure in that the rate Sα of the area occupied by the sealing material layers to the total area of a cross-section including the through holes in the direction perpendicular to the through holes was 1.4%, with the rate Vα of organic components being set to 0.20% by weight, was manufactured.

Example 4

First, the same processes as those of (1) and (2) of Example 1 were carried out to produce a honeycomb structural body.

Then, the above-mentioned honeycomb structural body was heated at 500° C. in an oxygen atmosphere for 10 minutes so that a honeycomb filter having a structure in that the rate Sα of the area occupied by the sealing material layers to the total area of a cross-section including the through holes in the direction perpendicular to the through holes was 1.4%, with the rate Vα of organic components being set to 0.50% by weight, was manufactured.

Comparative Example 1

(1) The same processes as (1) of Example 1 were carried out to produce a columnar body.

(2) A sealing material paste layer was formed on the circumference of the columnar body by using the same sealing material paste as the sealing material paste used in (2) of Example 1.

Then, by drying this sealing material paste layer at 120° C., a cylinder-shaped honeycomb filter having a thickness of sealing material layer of 0.5 mm and a diameter of an end face of 143.8 mm, as shown in FIG. 1, was manufactured.

In the honeycomb filter thus manufactured in Comparative Example 1, the rate Sα of the area occupied by the sealing material layers to the total area of a cross-section including the through holes in the direction perpendicular to the through holes was 1.4%, and the rate Vα of organic components to the honeycomb filter was 0.60% by weight.

(Evaluation Test 1)

Each of the honeycomb filters manufactured in Examples 1 to 4 and Comparative Example 1 was installed in an exhaust passage of an engine, and the engine was driven at the highest number of revolutions (3700 rpm, 0 Nm) in an unloaded condition.

At this time, supposing that: the amount of HC contained in exhaust gases prior to the introduction into the honeycomb filter is A; and that the amount of HC contained in exhaust gases that have been discharged outside after passing through the honeycomb filter is B, the increasing rate of HC that has increased when the exhaust gases pass through each honeycomb filter is calculated from the following formula (1):

Increasing rate of $HC$ (%)=100×($B$−$A$)/$A$    (1)

(Evaluation Test 2)

An alumina layer was applied to each of the honeycomb filters manufactured in Examples 1 to 4 and Comparative Example 1 at a rate of 10 g/L so as to form a backing on which a catalyst was supported, and platinum was supported thereon at a rate of 2 g/L as a catalyst for purifying exhaust gases; thereafter, this was installed in an exhaust passage of an engine, and the engine was driven at the highest number of revolutions (3700 rpm, 0 Nm) in an unloaded condition.

At this time, supposing that the amount of HC contained in exhaust gases prior to the introduction into the honeycomb filter is A and that the amount of HC contained in exhaust gases that have been discharged outside after passing through the honeycomb filter is B', the increasing rate of HC that has increased when the exhaust gases pass through each honeycomb filter is calculated from the following formula (2):

Increasing rate of $HC$ (%)=100×($B'$−$A$)/$A$    (2)

The results of the tests are shown in the following Table 1 and FIG. 5.

Figure 5:
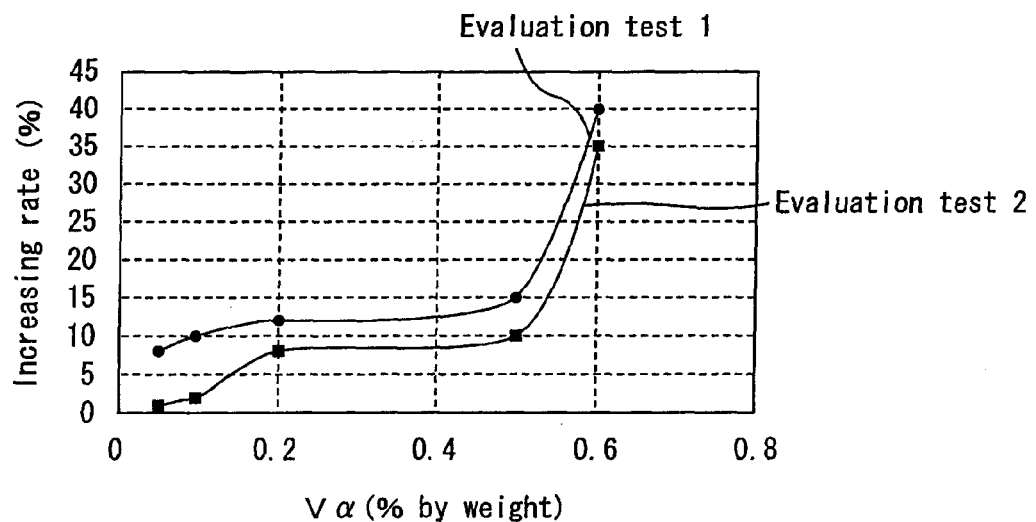
FIG. 5 is a graph that shows the results of an evaluation test 1 and an evaluation test 2 of honeycomb filters according to Examples 1 to 4 and Comparative Example 1.

Here, FIG. 5 is a graph that shows the results of the evaluation test 1 and the evaluation test 2 of honeycomb filters according to Examples 1 to 4 and Comparative Example 1.

TABLE 1

| | Sα (%) | Vα (% by weight) | Increasing rate of HC (%) | |
|---|---|---|---|---|
| | | | Evaluation test 1 | Evaluation test 2 |
| Example 1 | 1.4 | 0.05 | 8 | 1 |
| Example 2 | 1.4 | 0.10 | 10 | 2 |
| Example 3 | 1.4 | 0.20 | 12 | 8 |
| Example 4 | 1.4 | 0.50 | 15 | 10 |
| Comparative Example 1 | 1.4 | 0.60 | 40 | 35 |

Based upon the results of the evaluation test 1, it was found that, although the increasing rate of HC of the honeycomb filters according to Examples 1 to 4 was in a range of 8 to 15% that was a very low level, the increasing rate of HC of the honeycomb filter according to Comparative Example 1 was 40% that was much greater than the increasing rate of HC in the honeycomb filters according to Examples 1 to 4.

Moreover, based upon the results of the evaluation test 2, it was found that, although the increasing rate of HC of the honeycomb filters according to Examples 1 to 4 with the catalyst supported thereon was in a range of 1 to 10% that was a very low level, the increasing rate of HC of the honeycomb filter according to Comparative Example 1 was 35% that was much greater than the increasing rate of HC in the honeycomb filters according to Examples 1 to 4.

Example 5

(1) The same processes as (1) of Example 1 were carried out to produce a columnar body.

(2) The same processes as (2) of Example 1 were carried out except that a heat resistant sealing material paste, which was composed of 27% by weight of alumina fibers having a fiber length of 0.2 mm, 19% by weight of silicon carbide particles having an average particle size of 0.6 μm, 14% by weight of silica sol, 13.2% by weight of carboxymethyl cellulose and 26.8% by weight of water, was used so that a sealing material layer having a thickness of 0.2 mm was formed on the circumference of the columnar body; thus, a honeycomb structural body was manufactured.

In the honeycomb structural body thus manufactured, the rate of the area occupied by the sealing material layers to the total area of a cross-section including the through holes in the direction perpendicular to the through holes was 0.6%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure in that the rate Sα of the area occupied by the sealing material layers to the total area of a cross-section including the through holes in the direction perpendicular to the through holes was 0.6%, with the rate Vα of organic components being set to 0.05% by weight was manufactured.

Example 6

First, the same processes as those of (1) and (2) of Example 5 were carried out to produce a honeycomb structural body.

Further, the above-mentioned honeycomb structural body was heated at 600° C. in an oxygen atmosphere for 60 minutes so that a honeycomb filter having a structure in that the rate Sα of the area occupied by the sealing material layers to the total area of a cross-section including the through holes in the direction perpendicular to the through holes was 0.6%, with the rate Vα of organic components being set to 0.10% by weight was manufactured.

Example 7

First, the same processes as those of (1) and (2) of Example 5 were carried out to produce a honeycomb structural body.

Further, the above-mentioned honeycomb structural body was heated at 500° C. in an oxygen atmosphere for 30 minutes so that a honeycomb filter having a structure in that the rate Sα of the area occupied by the sealing material layers to the total area of a cross-section including the through holes in the direction perpendicular to the through holes was 0.6%, with the rate Vα of organic components being set to 0.20% by weight was manufactured.

Example 8

First, the same processes as those of (1) and (2) of Example 5 were carried out to produce a honeycomb structural body.

Then, the above-mentioned honeycomb structural body was heated at 500° C. in an oxygen atmosphere for 10 minutes so that a honeycomb filter having a structure in that the rate Sα of the area occupied by the sealing material layers to the total area of a cross-section including the through holes in the direction perpendicular to the through holes was 0.6%, with the rate Vα of organic components being set to 0.50% by weight was manufactured.

Comparative Example 2

(1) The same processes as (1) of Example 5 were carried out to produce a columnar body.

(2) A sealing material paste layer was formed on the circumference of the columnar body by using the same sealing material paste as the sealing material paste used in (2) of Example 5.

Then, by drying this sealing material paste layer at 120° C., a cylinder-shaped honeycomb filter having a thickness of sealing material layer of 0.2 mm and a diameter of an end face of 143.8 mm, as shown in FIG. 1, was manufactured.

In the honeycomb filter thus manufactured in Comparative Example 2, the rate Sα of the area occupied by the sealing material layers to the total area of a cross-section including the through holes in the direction perpendicular to the through holes was 0.6%, and the rate Vα of organic components to the honeycomb filter was 0.60% by weight.

The same evaluation tests as the evaluation tests 1 and 2, that had been carried out on Examples 1 to 4 and Comparative Example 1, were also carried out on Examples 5 to 8 and Comparative Example 2.

The results of these tests are shown in the following Table 2 and FIG. 6.

Figure 6:
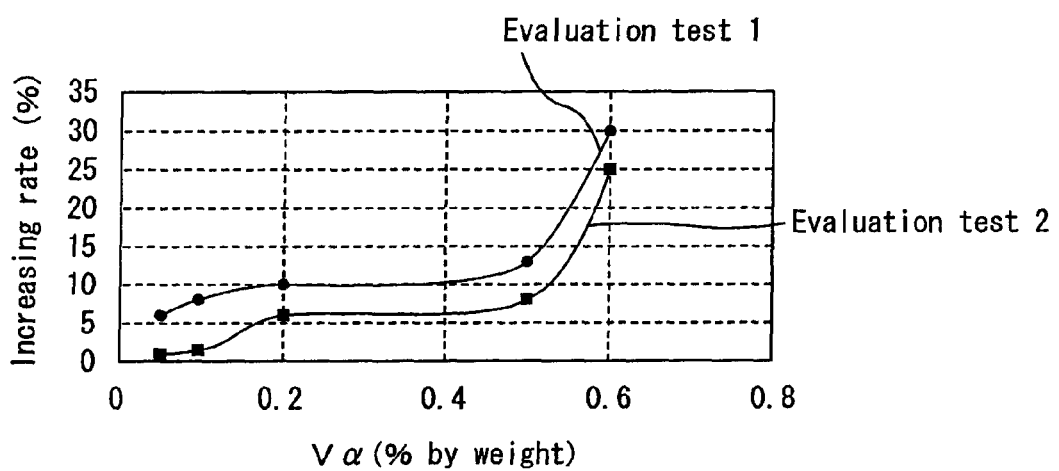
FIG. 6 is a graph that shows the results of the evaluation test 1 and the evaluation test 2 of honeycomb filters according to Examples 5 to 8 and Comparative Example 2.

Here, FIG. 6 is a graph that shows the results of the evaluation test 1 and the evaluation test 2 of honeycomb filters according to Examples 5 to 8 and Comparative Example 2.

TABLE 2

|  | Sα (%) | Vα (% by weight) | Increasing rate of HC (%) | |
|---|---|---|---|---|
|  |  |  | Evaluation test 1 | Evaluation test 2 |
| Example 5 | 0.6 | 0.05 | 6 | 1 |
| Example 6 | 0.6 | 0.10 | 8 | 1.5 |
| Example 7 | 0.6 | 0.20 | 10 | 6 |

TABLE 2-continued

|  | Sα (%) | Vα (% by weight) | Increasing rate of HC (%) | |
|---|---|---|---|---|
|  |  |  | Evaluation test 1 | Evaluation test 2 |
| Example 8 | 0.6 | 0.50 | 13 | 8 |
| Comparative Example 2 | 0.6 | 0.60 | 30 | 25 |

Based upon the results of the evaluation test 1, it was found that, although the increasing rate of HC of the honeycomb filters according to Examples 5 to 8 was in a range of 6 to 13% that was a very low level, the increasing rate of HC of the honeycomb filter according to Comparative Example 2 was 30% that was much greater than the increasing rate of HC in the honeycomb filters according to Examples 5 to 8.

Moreover, based upon the results of the evaluation test 2, it was found that, although the increasing rate of HC of the honeycomb filters according to Examples 5 to 8 with the catalyst supported thereon was in a range of 1 to 8% that was a very low level, the increasing rate of HC of the honeycomb filter according to Comparative Example 2 was 25% that was much greater than the increasing rate of HC in the honeycomb filters according to Examples 5 to 8.

Example 9

(1) The same processes as (1) of Example 1 were carried out to produce a columnar body.

(2) The same processes as (2) of Example 1 were carried out except that a heat resistant sealing material paste, which was composed of 26% by weight of alumina fibers having a fiber length of 0.2 mm, 19% by weight of silicon carbide particles having an average particle size of 0.6 μm, 14% by weight of silica sol, 15.8% by weight of carboxymethyl cellulose and 25.2% by weight of water, was used so that a sealing material layer having a thickness of 0.17 mm was formed on the circumference of the columnar body; thus, a honeycomb structural body was manufactured.

In the honeycomb structural body thus manufactured, the rate of the area occupied by the sealing material layers to the total area of a cross-section including the through holes in the direction perpendicular to the through holes was 0.5%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate Sα of the area occupied by the sealing material layers to the total area of a cross-section including the through holes in the direction perpendicular to the through holes was 0.5%, with the rate Vα of organic components being set to 0.05% by weight, was manufactured.

Example 10

First, the same processes as those of (1) and (2) of Example 9 were carried out to produce a honeycomb structural body.

Further, the above-mentioned honeycomb structural body was heated at 600° C. in an oxygen atmosphere for 60 minutes so that a honeycomb filter having a structure, in which the rate Sα of the area occupied by the sealing material layers to the total area of a cross-section including the through holes in the direction perpendicular to the through holes was 0.5%, with the rate Vα of organic components being set to 0.10% by weight, was manufactured.

Example 11

First, the same processes as those of (1) and (2) of Example 9 were carried out to produce a honeycomb structural body.

Further, the above-mentioned honeycomb structural body was heated at 500° C. in an oxygen atmosphere for 30 minutes so that a honeycomb filter having a structure, in which the rate Sα of the area occupied by the sealing material layers to the total area of a cross-section including the through holes in the direction perpendicular to the through holes was 0.5%, with the rate Vα of organic components being set to 0.20% by weight, was manufactured.

Example 12

First, the same processes as those of (1) and (2) of Example 9 were carried out to produce a honeycomb structural body.

Then, the above-mentioned honeycomb structural body was heated at 500° C. in an oxygen atmosphere for 10 minutes so that a honeycomb filter having a structure, in which the rate Sα of the area occupied by the sealing material layers to the total area of a cross-section including the through holes in the direction perpendicular to the through holes was 0.5%, with the rate Vα of organic components being set to 0.50% by weight, was manufactured.

Comparative Example 3

(1) The same processes as (1) of Example 9 were carried out to produce a columnar body.

(2) A sealing material paste layer was formed on the circumference of the columnar body by using the same sealing material paste as the sealing material paste used in (2) of Example 9.

Then, by drying this sealing material paste layer at 120° C., a cylinder-shaped honeycomb filter having a thickness of sealing material layer of 0.17 mm and a diameter of an end face of 143.8 mm, as shown in FIG. 1, was manufactured.

In the honeycomb filter thus manufactured in Comparative Example 3, the rate Sα of the area occupied by the sealing material layers to the total area of a cross-section including the through holes in the direction perpendicular to the through holes was 0.5%, and the rate Vα of organic components to the honeycomb filter was 0.60% by weight.

The same evaluation tests as the evaluation tests 1 and 2, that had been carried out on Examples 1 to 4 and Comparative Example 1, were also carried out on honeycomb filters according to Examples 9 to 12 and Comparative Example 3.

The results of these tests are shown in the following Table 3 and FIG. 7.

Figure 7:
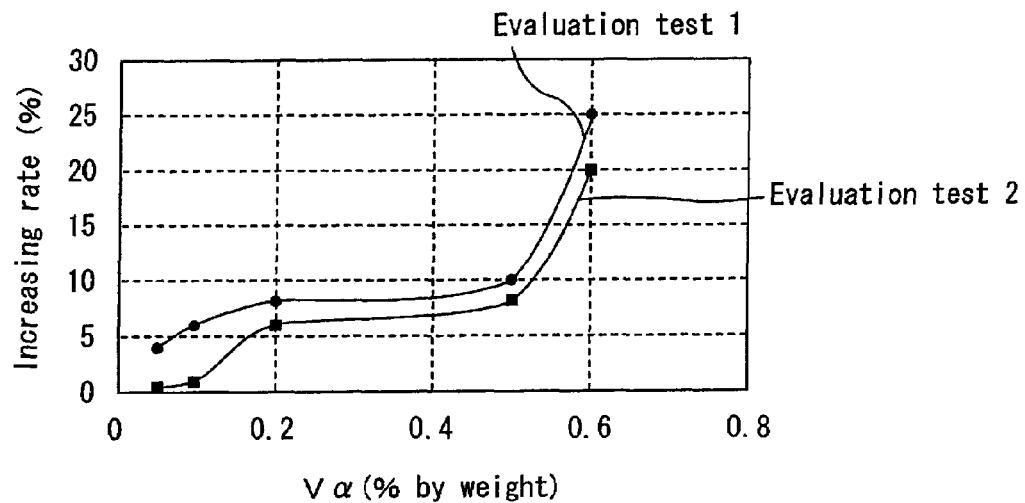
FIG. 7 is a graph that shows the results of the evaluation test 1 and the evaluation test 2 of honeycomb filters according to Examples 9 to 12 and Comparative Example 3.

Here, FIG. 7 is a graph that shows the results of the evaluation test 1 and the evaluation test 2 of honeycomb filters according to Examples 9 to 12 and Comparative Example 3.

TABLE 3

| | | | Increasing rate of HC (%) | |
| --- | --- | --- | --- | --- |
| | Sα (%) | Vα (% by weight) | Evaluation test 1 | Evaluation test 2 |
| Example 9 | 0.5 | 0.05 | 4 | 0.5 |
| Example 10 | 0.5 | 0.10 | 6 | 1 |
| Example 11 | 0.5 | 0.20 | 8 | 6 |
| Example 12 | 0.5 | 0.50 | 10 | 8 |
| Comparative Example 3 | 0.5 | 0.60 | 25 | 20 |

Based upon the results of the evaluation test 1, it was found that, although the increasing rate of HC of the honeycomb filters according to Examples 9 to 12 was in a range of 4 to 10% that was a very low level, the increasing rate of HC of the honeycomb filter according to Comparative Example 3 was 25% that was much greater than the increasing rate of HC in the honeycomb filters according to Examples 9 to 12.

Moreover, based upon the results of the evaluation test 2, it was found that, although the increasing rate of HC of the honeycomb filters according to Examples 9 to 12 with the catalyst supported thereon was in a range of 0.5 to 8% that was a very low level, the increasing rate of HC of the honeycomb filter according to Comparative Example 3 was 20% that was much greater than the increasing rate of HC in the honeycomb filters according to Examples 9 to 12.

Comparative Example 4

(1) The same processes as (1) of Example 1 were carried out to produce a columnar body.

(2) The same processes as (2) of Example 1 were carried out except that a heat resistant sealing material paste, which was composed of 23% by weight of alumina fibers having a fiber length of 0.2 mm, 16% by weight of silicon carbide particles having an average particle size of 0.6 μm, 12% by weight of silica sol, 26.3% by weight of carboxymethyl cellulose and 22.7% by weight of water, was used so that a sealing material layer having a thickness of 0.1 mm was formed on the circumference of the columnar body; thus, a honeycomb structural body was manufactured.

In the honeycomb structural body thus manufactured, the rate of the area occupied by the sealing material layers to the total area of a cross-section including the through holes in the direction perpendicular to the through holes was 0.3%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate Sα of the area occupied by the sealing material layers to the total area of a cross-section including the through holes in the direction perpendicular to the through holes was 0.3%, with the rate Vα of organic components being set to 0.05% by weight, was manufactured.

Comparative Example 5

First, the same processes as those of (1) and (2) of Comparative Example 4 were carried out to produce a honeycomb structural body.

Further, the above-mentioned honeycomb structural body was heated at 600° C. in an oxygen atmosphere for 60 minutes so that a honeycomb filter having a structure, in which the rate Sα of the area occupied by the sealing material layers to the total area of a cross-section including the through holes in the direction perpendicular to the through holes was 0.3%, with the rate Vα of organic components being set to 0.10% by weight, was manufactured.

Comparative Example 6

First, the same processes as those of (1) and (2) of Comparative Example 4 were carried out to produce a honeycomb structural body.

Further, the above-mentioned honeycomb structural body was heated at 500° C. in an oxygen atmosphere for 30 minutes so that a honeycomb filter having a structure, in which the rate Sα of the area occupied by the sealing material layers to the total area of a cross-section including the through holes in the direction perpendicular to the through holes was 0.3%, with the rate Vα of organic components being set to 0.20% by weight, was manufactured.

Comparative Example 7

First, the same processes as those of (1) and (2) of Example 5 were carried out to produce a honeycomb structural body.

Then, the above-mentioned honeycomb structural body was heated at 500° C. in an oxygen atmosphere for 10 minutes so that a honeycomb filter having a structure, in which the rate Sα of the area occupied by the sealing material layers to the total area of a cross-section including the through holes in the direction perpendicular to the through holes was 0.3%, with the rate Vα of organic components being set to 0.50% by weight, was manufactured.

Comparative Example 8

(1) The same processes as (1) of Comparative Example 4 were carried out to produce a columnar body.

(2) A sealing material paste layer was formed on the circumference of the columnar body by using the same sealing material paste as the sealing material paste used in (2) of Comparative Example 4.

Then, by drying this sealing material paste layer at 120° C., a cylinder-shaped honeycomb filter having a thickness of sealing material layer of 0.1 mm and a diameter of an end face of 143.8 mm, as shown in FIG. 1, was manufactured.

In the honeycomb filter thus manufactured in Comparative Example 8, the rate Sα of the area occupied by the sealing material layers to the total area of a cross-section including the through holes in the direction perpendicular to the through holes was 0.3%, and the rate Vα of organic components to the honeycomb filter was 0.60% by weight.

The same evaluation tests as the evaluation tests 1 and 2, that had been carried out on Examples 1 to 4 and Comparative Example 1, were also carried out on honeycomb filters manufactured in Comparative Examples 4 to 8.

The results of these tests are shown in the following Table 4 and FIG. 8.

Figure 8:
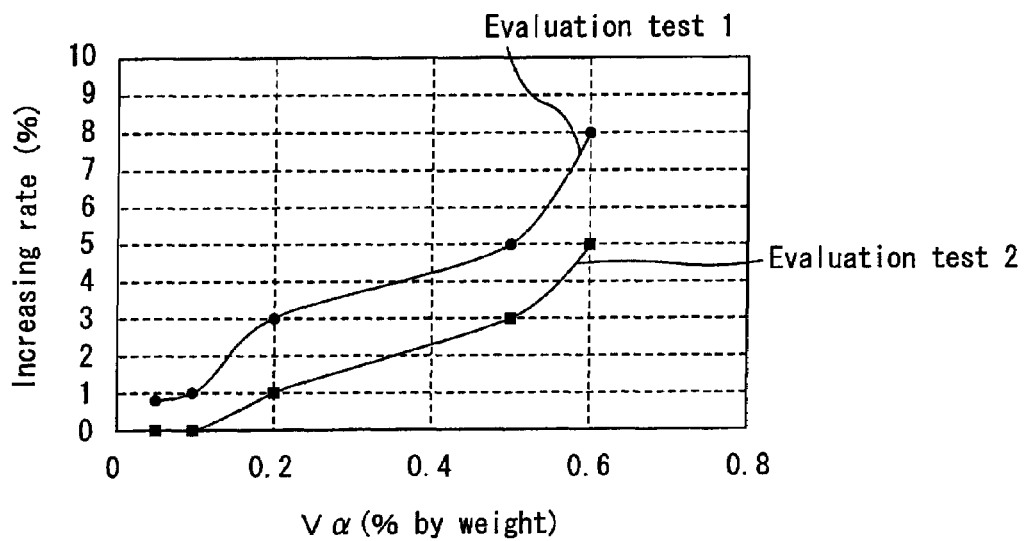
FIG. 8 is a graph that shows the results of the evaluation test 1 and the evaluation test 2 of honeycomb filters according to Comparative Examples 4 to 8.

Here, FIG. 8 is a graph that shows the results of the evaluation test 1 and the evaluation test 2 of honeycomb filters according to Comparative Examples 4 to 8.

TABLE 4

| | | | Increasing rate of HC (%) | |
|---|---|---|---|---|
| | Sα (%) | Vα (% by weight) | Evaluation test 1 | Evaluation test 2 |
| Comparative Example 4 | 0.3 | 0.05 | 0.8 | 0 |
| Comparative Example 5 | 0.3 | 0.10 | 1 | 0 |
| Comparative Example 6 | 0.3 | 0.20 | 3 | 1 |
| Comparative Example 7 | 0.3 | 0.50 | 5 | 3 |
| Comparative Example 8 | 0.3 | 0.60 | 8 | 5 |

Based upon the results of the evaluation test 1, the increasing rate of HC of the honeycomb filters according to Comparative Examples 4 to 8 was in a range of 0.8 to 8% that was a very low level, and based upon the results of the evaluation test 2, the increasing rate of HC of the honeycomb filter according to Comparative Examples 4 to 8 with a catalyst supported thereon was in a range of 0 to 5% that was also a very low level.

In this manner, each of the honeycomb filters according to Examples 1 to 12 and Comparative Examples 1 to 8 has a structure in that a sealing material layer is formed only on the circumference of a columnar body, and in each of the honeycomb filters according to Examples 1 to 12 and Comparative Examples 1 to 3, the rate Sα of the area occupied by the sealing material layers to the total area of a cross-section including the through holes in the direction perpendicular to the through holes is 0.5% or more.

The results of the evaluation test 1 indicate that, in the honeycomb filters according to Examples 1 to 12 in which the rate Vα of organic components is 0.50% by weight or less, the amount of organic components to be discharged from the sealing material layer becomes smaller to cause hardly any increase in HC in discharged exhaust gases, and the results of the evaluation test 2 indicate that, when a catalyst is supported on the honeycomb filter of this type, it becomes possible to significantly decrease the increasing rate of HC to be discharged outside.

In contrast, in the case of the honeycomb filters according to Comparative Examples 1 to 3 in which the rate Vα of organic components exceeds 0.50% by weight, the amount of organic components to be discharged from the sealing material layer becomes greater, resulting in a high increasing rate in HC in the discharged exhaust gases, and the results of the evaluation test 2 indicate that in the case where a catalyst is supported on the honeycomb filter of this type, although the increasing rate of HC to be discharged outside becomes slightly lower, it becomes greater in comparison with the increasing rate in the honeycomb filters according to Examples 1 to 12.

Moreover, the results of the evaluation test 1 of the honeycomb filters according to Comparative Examples 4 to 8 indicate that, in the case where the rate Sα of the area occupied by the sealing material layers to the total area of a cross-section including the through holes in the direction perpendicular to the through holes in the honeycomb filter is less than 0.5%, the amount of organic components to be discharged from the sealing material layer becomes smaller, even in the case of the rate Vα of organic components exceeding 0.50% by weight, resulting in hardly any increase in HC in the discharged exhaust gases.

In other words, in the case of the honeycomb filter in which the rate Sα is less than 0.5%, even when the rate of organic components contained in the sealing material layer becomes greater, the honeycomb filter is less likely to generate a problem, such as an increase in the amount of HC in exhaust gases to be discharged, as shown in Comparative Examples 1 to 3.

Moreover, the results of the evaluation test 2 indicate that by allowing the honeycomb filter of this type to support a catalyst, it becomes possible to significantly decrease the increasing rate of HC to be discharged outside.

Example 13

(1) Powder of α-type silicon carbide having an average particle size of 5 μm (60% by weight) and powder of β-type silicon carbide having an average particle size of 0.5 μm (40% by weight) were wet-mixed, and to 100 parts by weight of the resulting mixture were added 5 parts by weight of an organic binder (methyl cellulose) and 10 parts by weight of water and then the resultant was kneaded to obtain a kneaded matter. Next, after a slight amount of a plasticizer and a lubricant had been added to the kneaded matter and this had been further kneaded, the resulting kneaded matter was extrusion-molded so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 2200° C. in a normal-pressure argon atmosphere for 3 hours to manufacture a porous ceramic member as shown in FIG. 3, which was made of a silicon carbide sintered body, and had a size of 34 mm×34 mm×300 mm, the number of through holes of 31 pcs/cm² and a thickness of the partition wall of 0.3 mm.

(2) A heat resistant sealing material paste, which was composed of 31% by weight of alumina fibers having a fiber length of 0.2 mm, 22% by weight of silicon carbide particles having an average particle size of 0.6 μm, 16% by weight of silica sol, 1% by weight of carboxymethyl cellulose and 30% by weight of water, was used so that, by carrying out the processes as described by reference to FIG. 4, a number of the porous ceramic members were combined with one another, and then cut by using a diamond cutter; thus, a cylinder-shaped ceramic block as shown in FIG. 2 was manufactured.

Next, a sealing material paste layer was formed on the circumference of the ceramic block by using the above-mentioned sealing material paste. Further, this sealing material paste layer was dried at 120° C. so that a cylinder-shaped honeycomb structural body having a diameter of 145.8 mm, with sealing material layers, each having a thickness of 1.0 mm, formed between the porous ceramic members as well as on the circumference of the ceramic block, as indicated by a honeycomb filter 20 of FIG. 2, was manufactured.

In the honeycomb structural body thus formed, the rate of the area occupied by the sealing material layers to the total area of a cross-section including the through holes in the direction perpendicular to the through holes was 7.4%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure in that the rate Sβ of the area occupied by the sealing material layers to the total area of a cross-section including the through holes in the direction perpendicular to the through holes was 7.4%, with the rate Vβ of organic components being set to 0.05% by weight, was manufactured.

Example 14

First, the same processes as those of (1) and (2) of Example 13 were carried out to produce a honeycomb structural body.

Then, the above-mentioned honeycomb structural body was heated at 600° C. in an oxygen atmosphere for 60 minutes so that a honeycomb filter having a structure in that the rate Sβ of the area occupied by the sealing material layers to the total area of a cross-section including the through holes in the direction perpendicular to the through holes was 7.4%, with the rate Vβ of organic components being set to 0.10% by weight, was manufactured.

Example 15

First, the same processes as those of (1) and (2) of Example 13 were carried out to produce a honeycomb structural body.

Then, the above-mentioned honeycomb structural body was heated at 500° C. in an oxygen atmosphere for 30 minutes so that a honeycomb filter having a structure in that the rate Sα of the area occupied by the sealing material layers to the total area of a cross-section including the through holes in the direction perpendicular to the through holes was 7.4%, with the rate Vβ of organic components being set to 0.20% by weight, was manufactured.

Example 16

First, the same processes as those of (1) and (2) of Example 13 were carried out to produce a honeycomb structural body.

Then, the above-mentioned honeycomb structural body was heated at 500° C. in an oxygen atmosphere for 10 minutes so that a honeycomb filter having a structure in that the rate Sβ of the area occupied by the sealing material layers to the total area of a cross-section including the through holes in the direction perpendicular to the through holes was 7.4%, with the rate Vβ of organic components being set to 0.50% by weight was manufactured.

Comparative Example 9

(1) The same processes as (1) of Example 13 were carried out to produce a porous ceramic member.

(2) A number of the porous ceramic members were combined with one another through a method described by reference to FIG. 4 by using the same sealing material paste as the sealing material paste used in (2) of Example 13, and this was cut by using a diamond cutter so that a cylinder-shaped ceramic block, as shown in FIG. 2, was manufactured.

Next, a sealing material paste layer was formed on the circumference of the ceramic block by using the above-mentioned sealing material paste. Then, by drying this sealing material paste layer at 120° C., a cylinder-shaped honeycomb filter having a diameter of 145.8 mm with a thickness of sealing material layers formed between porous ceramic members as well as on the circumference of the ceramic block being set to 1.0 mm, was manufactured, as indicated by the honeycomb filter 20 in FIG. 2.

In the honeycomb filter thus manufactured in Comparative Example 9, the rate Sα of the area occupied by the sealing material layers to the total area of a cross-section including the through holes in the direction perpendicular to the through holes was 7.4%, and the rate Vβ of organic components to the honeycomb filter was 0.60% by weight.

The same evaluation tests as the evaluation tests 1 and 2, that had been carried out on Examples 1 to 4 and Comparative Example 1, were also carried out on honeycomb filters according to Comparative Examples 13 to 16 and Comparative Example 9.

The results of these tests are shown in the following Table 5 and FIG. 9.

Figure 9:
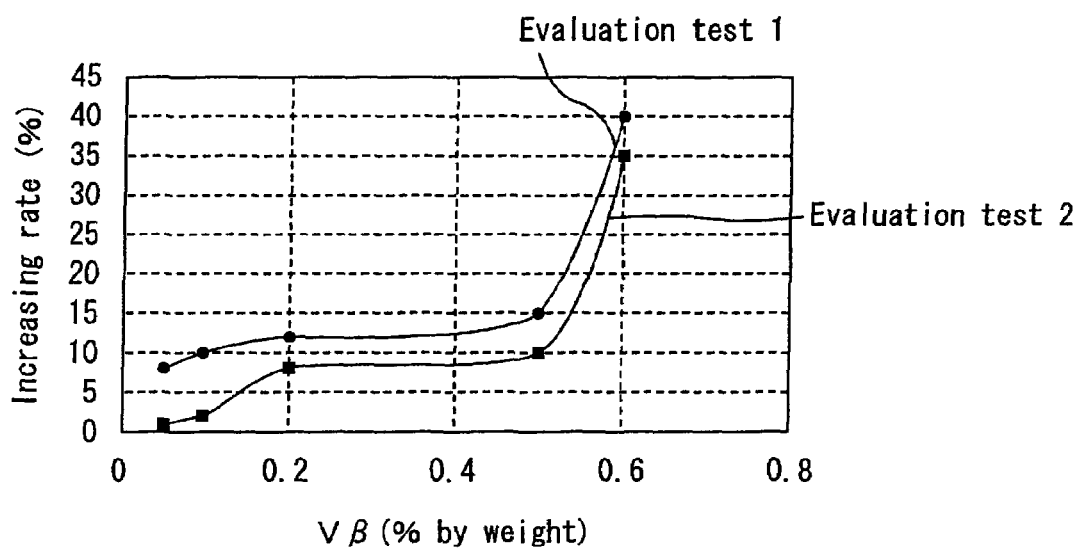
FIG. 9 is a graph that shows the results of the evaluation test 1 and the evaluation test 2 of honeycomb filters according to Examples 13 to 16 and Comparative Example 9.

Here, FIG. 9 is a graph that shows the results of the evaluation test 1 and the evaluation test 2 of honeycomb filters according to Examples 13 to 16 and Comparative Example 9.

TABLE 5

|  | Sβ (%) | Vβ (% by weight) | Increasing rate of HC (%) | |
|---|---|---|---|---|
|  |  |  | Evaluation test 1 | Evaluation test 2 |
| Example 13 | 7.4 | 0.05 | 8 | 1 |
| Example 14 | 7.4 | 0.10 | 10 | 2 |
| Example 15 | 7.4 | 0.20 | 12 | 8 |
| Example 16 | 7.4 | 0.50 | 15 | 10 |
| Comparative Example 9 | 7.4 | 0.60 | 40 | 35 |

Based upon the results of the evaluation test 1, the increasing rate of HC in the honeycomb filters according to Examples 13 to 16 was in a range of 8 to 15% that was a very low level; however, the increasing rate of HC in the honeycomb filter according to Comparative Example 9 was 40% that was excessively greater than the increasing rate of HC in the honeycomb filters according to Examples 13 to 16.

Based upon the results of the evaluation test 2, the increasing rate of HC in the honeycomb filters according to Examples 13 to 16 was in a range of 1 to 10% that was a very low level; however, the increasing rate of HC in the honeycomb filter, with a catalyst supported thereon, according to Comparative Example 9 was 35% that was excessively greater than the increasing rate of HC in the honeycomb filters according to Examples 13 to 16.

Example 17

(1) The same processes as (1) of Example 13 were carried out to produce a porous ceramic member.

(2) The same processes as (2) of Example 13 were carried out except that a heat resistant sealing material paste, which was composed of 31% by weight of alumina fibers having a fiber length of 0.2 mm, 22% by weight of silicon carbide particles having an average particle size of 0.6 μm, 16% by weight of silica sol, 2% by weight of carboxymethyl cellulose and 29% by weight of water, was used so that a sealing material layer having a thickness of 0.5 mm was formed; thus, a honeycomb structural body was manufactured.

In the honeycomb structural body thus manufactured, the rate of the area occupied by the sealing material layers to the total area of a cross-section including the through holes in the direction perpendicular to the through holes was 3.8%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate Sβ of the area occupied by the sealing material layers to the total area of a cross-section including the through holes in the direction perpendicular to the through holes was 3.8%, with the rate Vβ of organic components being set to 0.05% by weight, was manufactured.

Example 18

First, the same processes as those of (1) and (2) of Example 17 were carried out to produce a honeycomb structural body.

Further, the above-mentioned honeycomb structural body was heated at 600° C. in an oxygen atmosphere for 60 minutes so that a honeycomb filter having a structure, in which the rate Sβ of the area occupied by the sealing material layers to the total area of a cross-section including the through holes in the direction perpendicular to the through holes was 3.8%, with the rate Vβ of organic components being set to 0.10% by weight, was manufactured.

Example 19

First, the same processes as those of (1) and (2) of Example 17 were carried out to produce a honeycomb structural body.

Further, the above-mentioned honeycomb structural body was heated at 500° C. in an oxygen atmosphere for 30 minutes so that a honeycomb filter having a structure, in which the rate Sβ of the area occupied by the sealing material layers to the total area of a cross-section including the through holes in the direction perpendicular to the through holes was 3.8%, with the rate Vβ of organic components being set to 0.20% by weight, was manufactured.

Example 20

First, the same processes as those of (1) and (2) of Example 13 were carried out to produce a honeycomb structural body.

Further, the above-mentioned honeycomb structural body was heated at 500° C. in an oxygen atmosphere for 10 minutes so that a honeycomb filter having a structure, in which the rate Sβ of the area occupied by the sealing material layers to the total area of a cross-section including the through holes in the direction perpendicular to the through holes was 3.8%, with the rate Vβ of organic components being set to 0.50% by weight, was manufactured.

Comparative Example 10

(1) The same processes as (1) of Example 17 were carried out to produce a porous ceramic member.

(2) The same processes as (2) of Comparative Example 9 were carried out except that the same sealing material paste as the sealing material paste used in (2) of Example 17 was used with a thickness of the sealing material layer being set to 0.5 mm; thus, a honeycomb filter was manufactured.

In the honeycomb filter thus manufactured in Comparative Example 10, the rate Sβ of the area occupied by the sealing material layers to the total area of a cross-section including the through holes in the direction perpendicular to the through holes was 4.0%, and the rate Vβ of organic components to the honeycomb filter was 0.60% by weight.

The same evaluation tests as the evaluation tests 1 and 2, that had been carried out on Examples 1 to 4 and Comparative Example 1, were also carried out on honeycomb filters according to Examples 17 to 20 and Comparative Example 10.

The results of these tests are shown in the following Table 6 and FIG. 10.

Figure 10:
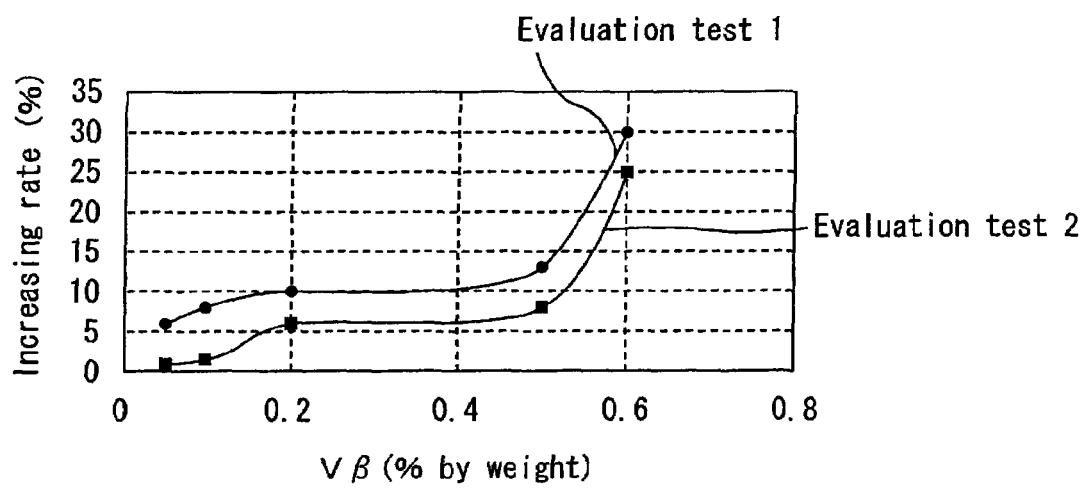
FIG. 10 is a graph that shows the results of the evaluation test 1 and the evaluation test 2 of honeycomb filters according to Examples 17 to 20 and Comparative Example 10.

Here, FIG. 10 is a graph that shows the results of the evaluation test 1 and the evaluation test 2 of honeycomb filters according to Examples 17 to 20 and Comparative Example 10.

TABLE 6

|  | Sβ (%) | Vβ (% by weight) | Increasing rate of HC (%) | |
|---|---|---|---|---|
|  |  |  | Evaluation test 1 | Evaluation test 2 |
| Example 17 | 3.8 | 0.05 | 6 | 1 |
| Example 18 | 3.8 | 0.10 | 8 | 1.5 |
| Example 19 | 3.8 | 0.20 | 10 | 6 |
| Example 20 | 3.8 | 0.50 | 13 | 8 |
| Comparative Example 10 | 3.8 | 0.60 | 30 | 25 |

The results of the evaluation test 1 show that the increasing rate of HC in the honeycomb filters according to Examples 17 to 20 was in a range of 6 to 13%, which was a very low level; however, the increasing rate of HC in the honeycomb filter according to Comparative Example 10 was 30%, which was much greater than the increasing rate of HC of the honeycomb filters according to Examples 17 to 20.

Moreover, the results of the evaluation test 2 show that the increasing rate of HC in the honeycomb filters with a catalyst supported thereon according to Examples 17 to 20 was in a range of 1 to 8%, which was a very low level; however, the increasing rate of HC in the honeycomb filter with a catalyst supported thereon according to Comparative Example 10 was 25%, which was much greater than the increasing rate of HC of the honeycomb filters according to Examples 17 to 20.

Example 21

(1) The same processes as (1) of Example 13 were carried out to produce a porous ceramic member.

(2) The same processes as (2) of Example 13 were carried out except that a heat resistant sealing material paste, which was composed of 30% by weight of alumina fibers having a fiber length of 0.2 mm, 21% by weight of silicon carbide particles having an average particle size of 0.6 μm, 16% by weight of silica sol, 4% by weight of carboxymethyl cellulose and 29% by weight of water, was used so that a sealing material layer having a thickness of 0.25 mm was formed; thus, a honeycomb structural body was manufactured.

In the honeycomb structural body thus manufactured, the rate of the area occupied by the sealing material layers to the total area of a cross-section including the through holes in the direction perpendicular to the through holes was 2.0%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.05% by weight, was manufactured.

Example 22

First, the same processes as those of (1) and (2) of Example 21 were carried out to produce a honeycomb structural body.

Further, the above-mentioned honeycomb structural body was heated at 600° C. in an oxygen atmosphere for 60 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.10% by weight, was manufactured.

Example 23

First, the same processes as those of (1) and (2) of Example 21 were carried out to produce a honeycomb structural body.

Further, the above-mentioned honeycomb structural body was heated at 500° C. in an oxygen atmosphere for 30 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.20% by weight, was manufactured.

Example 24

First, the same processes as those of (1) and (2) of Example 21 were carried out to produce a honeycomb structural body.

Further, the above-mentioned honeycomb structural body was heated at 500° C. in an oxygen atmosphere for 10 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.50% by weight, was manufactured.

Comparative Example 11

(1) The same processes as (1) of Example 21 were carried out to produce a porous ceramic member.

(2) The same processes as (2) of Comparative Example 9 were carried out except that the same sealing material paste as the sealing material paste used in (2) of Example 21 was used with a thickness of the sealing material layer being set to 0.25 mm; thus, a honeycomb filter was manufactured.

In the honeycomb filter thus manufactured in Comparative Example 11, the rate $S\beta$ of the area occupied by the sealing material layers to the total area of a cross-section including the through holes in the direction perpendicular to the through holes was 2.0%, and the rate $V\beta$ of organic components to the honeycomb filter was 0.60% by weight.

The same evaluation tests as the evaluation tests 1 and 2, that had been carried out on Examples 1 to 4 and Comparative Example 1, were also carried out on honeycomb filters according to Examples 21 to 24 and Comparative Example 11.

The results of these tests are shown in the following Table 7 and FIG. 11.

Figure 11:
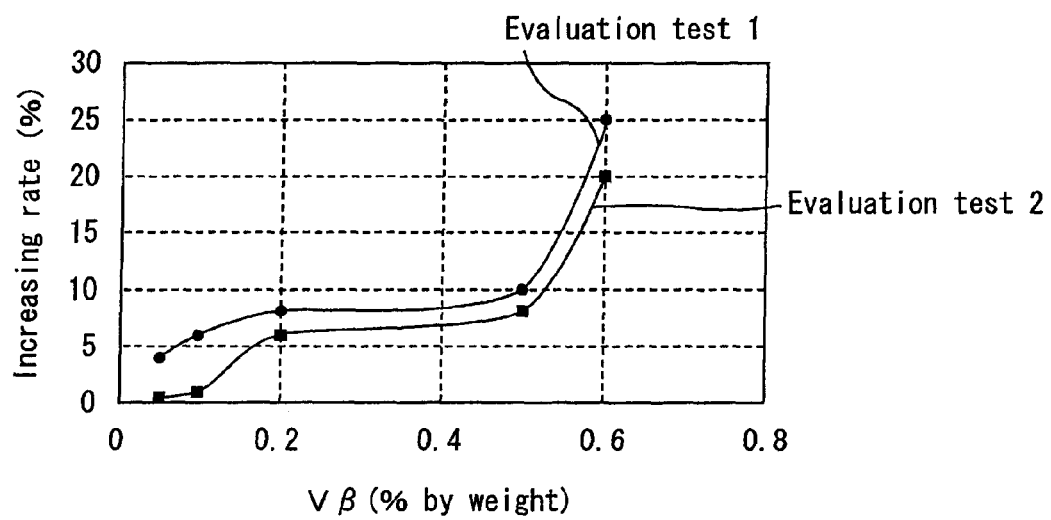
FIG. 11 is a graph that shows the results of the evaluation test 1 and the evaluation test 2 of honeycomb filters according to Examples 21 to 24 and Comparative Example 11.

Here, FIG. 11 is a graph that shows the results of the evaluation test 1 and the evaluation test 2 of honeycomb filters according to Examples 21 to 24 and Comparative Example 11.

TABLE 7

| | | | Increasing rate of HC (%) | |
|---|---|---|---|---|
| | $S\beta$ (%) | $V\beta$ (% by weight) | Evaluation test 1 | Evaluation test 2 |
| Example 21 | 1.9 | 0.05 | 4 | 0.5 |
| Example 22 | 1.9 | 0.10 | 6 | 1 |
| Example 23 | 1.9 | 0.20 | 8 | 6 |
| Example 24 | 1.9 | 0.50 | 10 | 8 |
| Comparative Example 11 | 1.9 | 0.60 | 25 | 20 |

The results of the evaluation test 1 show that the increasing rate of HC in the honeycomb filters according to Examples 21 to 24 was in a range of 4 to 10%, which was a very low level; however, the increasing rate of HC in the honeycomb filter according to Comparative Example 11 was 25%, which was much greater than the increasing rate of HC of the honeycomb filters according to Examples 21 to 24.

Moreover, the results of the evaluation test 2 show that the increasing rate of HC in the honeycomb filters with a catalyst supported thereon according to Examples 21 to 24 was in a range of 0.5 to 8%, which was a very low level; however, the increasing rate of HC in the honeycomb filter with a catalyst supported thereon according to Comparative Example 11 was 20%, which was much greater than the increasing rate of HC of the honeycomb filters according to Examples 21 to 24.

Comparative Example 12

(1) The same processes as (1) of Example 13 were carried out to produce a porous ceramic member.

(2) The same processes as (2) of Example 13 were carried out except that a heat resistant sealing material paste, which was composed of 28% by weight of alumina fibers having a fiber length of 0.2 mm, 20% by weight of silicon carbide particles having an average particle size of 0.6 μm, 15% by weight of silica sol, 10% by weight of carboxymethyl cellulose and 27% by weight of water, was used so that a sealing material layer having a thickness of 0.1 mm was formed; thus, a honeycomb structural body was manufactured.

In the honeycomb structural body thus manufactured, the rate of the area occupied by the sealing material layers to the total area of a cross-section including the through holes in the direction perpendicular to the through holes was 0.8%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate $S\beta$ of the area occupied by the sealing material layers to the total area of a cross-section including the through holes in the direction perpendicular to the through holes was 0.8%, with the rate $V\beta$ of organic components being set to 0.05% by weight, was manufactured.

Comparative Example 13

First, the same processes as those of (1) and (2) of Comparative Example 12 were carried out to produce a honeycomb structural body.

Further, the above-mentioned honeycomb structural body was heated at 600° C. in an oxygen atmosphere for 60 minutes so that a honeycomb filter having a structure, in which the rate $S\beta$ of the area occupied by the sealing material layers to the total area of a cross-section including the through holes in the direction perpendicular to the through holes was 0.8%, with the rate $V\beta$ of organic components being set to 0.10% by weight, was manufactured.

Comparative Example 14

First, the same processes as those of (1) and (2) of Comparative Example 12 were carried out to produce a honeycomb structural body.

Further, the above-mentioned honeycomb structural body was heated at 500° C. in an oxygen atmosphere for 30 minutes so that a honeycomb filter having a structure, in which the rate $S\beta$ of the area occupied by the sealing material layers to the total area of a cross-section including the through holes in the direction perpendicular to the through holes was 0.8%, with the rate $V\beta$ of organic components being set to 0.20% by weight, was manufactured.

Comparative Example 15

First, the same processes as those of (1) and (2) of Comparative Example 12 were carried out to produce a honeycomb structural body.

Further, the above-mentioned honeycomb structural body was heated at 500° C. in an oxygen atmosphere for 10 minutes so that a honeycomb filter having a structure, in which the rate $S\beta$ of the area occupied by the sealing material layers to the total area of a cross-section including the through holes in the direction perpendicular to the through holes was 0.8%, with the rate $V\beta$ of organic components being set to 0.50% by weight, was manufactured.

Comparative Example 16

(1) The same processes as (1) of Example 13 were carried out to produce a porous ceramic member.

(2) The same processes as (2) of Comparative Example 9 were carried out except that the same sealing material paste as the sealing material paste used in (2) of Comparative Example 12 was used with a thickness of the sealing material layer being set to 0.1 mm; thus, a honeycomb filter was manufactured.

In the honeycomb filter thus manufactured in Comparative Example 16, the rate $S\beta$ of the area occupied by the sealing material layers to the total area of a cross-section including the through holes in the direction perpendicular to the through holes was 0.8%, and the rate $V\beta$ of organic components to the honeycomb filter was 0.60% by weight.

The same evaluation tests as the evaluation tests 1 and 2, that had been carried out on Examples 1 to 4 and Comparative Example 1, were also carried out on honeycomb filters according to Comparative Examples 12 to 16.

The results of these tests are shown in the following Table 8 and FIG. 12.

Figure 12:
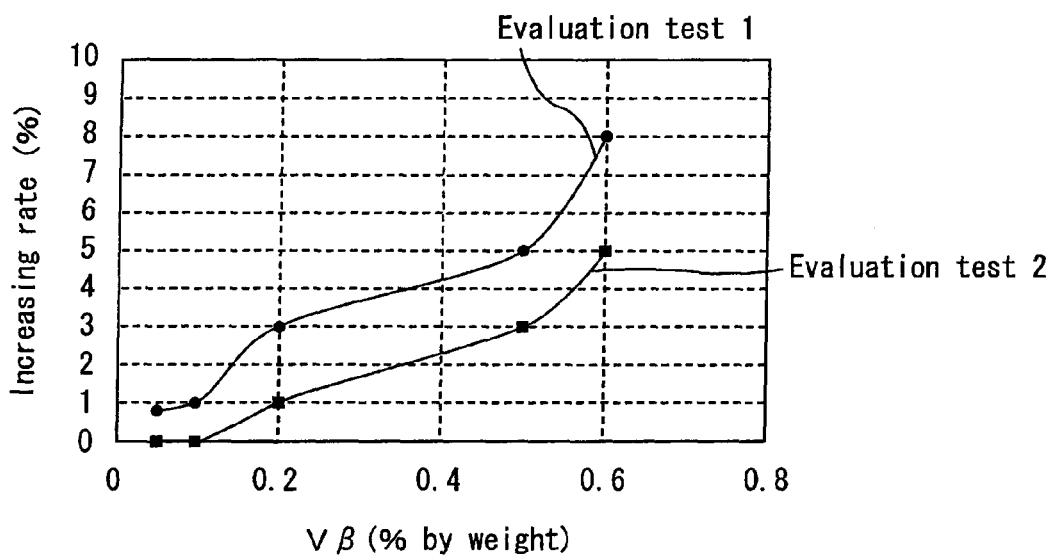
FIG. 12 is a graph that shows the results of the evaluation test 1 and the evaluation test 2 of honeycomb filters according to Comparative Examples 12 to 16.

Here, FIG. 12 is a graph that shows the results of the evaluation test 1 and the evaluation test 2 of honeycomb filters according to Comparative Examples 12 to 16.

TABLE 8

|  | $S\beta$ (%) | $V\beta$ (% by weight) | Increasing rate of HC (%) | |
| --- | --- | --- | --- | --- |
|  |  |  | Evaluation test 1 | Evaluation test 2 |
| Comparative Example 12 | 0.8 | 0.05 | 0.8 | 0 |
| Comparative Example 13 | 0.8 | 0.10 | 1 | 0 |
| Comparative Example 14 | 0.8 | 0.20 | 3 | 1 |
| Comparative Example 15 | 0.8 | 0.50 | 5 | 3 |
| Comparative Example 16 | 0.8 | 0.60 | 8 | 5 |

The results of the evaluation test 1 show that the increasing rate of HC in the honeycomb filters according to Comparative Examples 12 to 16 was in a range of 0.8 to 8%, which was a very low level, and the results of the evaluation test 2 show that the increasing rate of HC in the honeycomb filters with a catalyst supported thereon according to Comparative Examples 12 to 16 was in a range of 0 to 5%, which was also a very low level.

As described above, the honeycomb filters according to Examples 13 to 24 and Comparative Examples 9 to 16 have a structure in that sealing material layers are formed between the porous ceramic members as well as on the circumference of the ceramic block, and in each of the honeycomb filters according to Examples 13 to 24 and Comparative Examples 9 to 11, the rate $S\beta$ of the area occupied by the sealing material layers to the total area of a cross-section including the through holes in the direction perpendicular to the through holes is set to 2% or more.

The results of the evaluation test 1 show that in the case of honeycomb filters according to Examples 13 to 24 that have the rate $V\beta$ of organic components being 0.50% by weight or less, the amount of organic components to be discharged from the sealing material layer becomes smaller to cause hardly any increase in HC in the discharged exhaust gases, and the results of the evaluation test 2 show that, when a catalyst is supported on such a honeycomb filter, it becomes possible to effectively reduce the increasing rate of HC to be discharged outside.

In contrast, in the case of honeycomb filters according to Comparative Examples 9 to 11 in which the rate Vβ of organic components exceeds 0.50% by weight, the amount of organic components to be discharged from the sealing material layer becomes greater to cause a very high increasing rate of HC in exhaust gases to be discharged, and the results of the evaluation test 2 indicate that in the case where a catalyst is supported on the honeycomb filter of this type, although the increasing rate of HC to be discharged outside becomes slightly lower, it becomes much greater in comparison with the increasing rate in the honeycomb filters according to Examples 13 to 24.

Moreover, the results of the evaluation test 1 of the honeycomb filters according to Comparative Examples 12 to 16 indicate that, in the case where the rate Sβ of the area occupied by the sealing material layers to the total area of a cross-section including the through holes in the direction perpendicular to the through holes in the honeycomb filter is less than 2%, the amount of organic components to be discharged from the sealing material layer becomes smaller, even in the case of the rate VP of organic components exceeding 0.5% by weight, resulting in hardly any increase in HC in the discharged exhaust gases.

In other words, in the case of the honeycomb filter in which the rate Sβ is less than 2%, even when the rate of organic components contained in the sealing material layer becomes greater, the honeycomb filter is less likely to generate a problem, such as an increase in the amount of HC in exhaust gases to be discharged, as shown in Comparative Examples 9 to 12.

Moreover, the results of the evaluation test 2 indicate that by allowing the honeycomb filter of this type to support a catalyst, it becomes possible to significantly decrease the increasing rate of HC to be discharged outside.

Example 25

(1) Powder of α-type silicon carbide having an average particle size of 20 μm (60% by weight) and silicon powder having an average particle size of 1.0 μm (40% by weight) were wet-mixed, and to 100 parts by weight of the resulting mixture were added 5 parts by weight of an organic binder (methyl cellulose) and 10 parts by weight of water and the resultant was kneaded to obtain a kneaded matter. Next, after a slight amount of a plasticizer and a lubricant had been added to the kneaded matter and this had been further kneaded, the resulting kneaded matter was extrusion-molded so that a raw formed body was manufactured.

Next, the above-mentioned raw formed body was dried by using a microwave drier, and predetermined through holes were then filled with a paste having the same composition as the raw formed body, and after this had been again dried by using a drier, this was degreased at 400° C., and sintered at 1600° C. in a normal-pressure argon atmosphere for 2 hours to manufacture a porous ceramic member as shown in FIG. 3, which was made of a silicon carbide-silicon sintered body, and had a size of 34 mm×34 mm×300 mm, the number of through holes of 31 pcs/cm² and a thickness of the partition wall of 0.3 mm.

(2) A heat resistant sealing material paste, which was composed of 31% by weight of alumina fibers having a fiber length of 0.2 mm, 22% by weight of silicon carbide particles having an average particle size of 0.6 μm, 16% by weight of silica sol, 1% by weight of carboxymethyl cellulose and 30% by weight of water, was used so that, by carrying out the processes as described by reference to FIG. 4, a number of the porous ceramic members were combined with one another, and then cut by using a diamond cutter; thus, a cylinder-shaped ceramic block as shown in FIG. 2 was manufactured.

Next, a sealing material paste layer was formed on the circumference of the ceramic block by using the above-mentioned sealing material paste. Further, this sealing material paste layer was dried at 120° C. so that a cylinder-shaped honeycomb structural body having a diameter of 145.8 mm, with sealing material layers, each having a thickness of 1.0 mm, formed between the porous ceramic members as well as on the circumference of the ceramic block, as indicated by a honeycomb filter 20 of FIG. 2, was manufactured.

In the honeycomb structural body thus formed, the rate of the area occupied by the sealing material layers to the total area of a cross-section including the through holes in the direction perpendicular to the through holes was 7.4%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure in that the rate Sβ of the area occupied by the sealing material layers to the total area of a cross-section including the through holes in the direction perpendicular to the through holes was 7.4%, with the rate Vβ of organic components being set to 0.05% by weight, was manufactured.

Example 26

First, the same processes as those of (1) and (2) of Example 25 were carried out to produce a honeycomb structural body.

Then, the above-mentioned honeycomb structural body was heated at 600° C. in an oxygen atmosphere for 60 minutes so that a honeycomb filter having a structure in that the rate Sβ of the area occupied by the sealing material layers to the total area of a cross-section including the through holes in the direction perpendicular to the through holes was 7.4%, with the rate Vβ of organic components being set to 0.10% by weight, was manufactured.

Example 27

First, the same processes as those of (1) and (2) of Example 25 were carried out to produce a honeycomb structural body.

Then, the above-mentioned honeycomb structural body was heated at 500° C. in an oxygen atmosphere for 30 minutes so that a honeycomb filter having a structure in that the rate Sβ of the area occupied by the sealing material layers to the total area of a cross-section including the through holes in the direction perpendicular to the through holes was 7.4%, with the rate Vβ of organic components being set to 0.20% by weight, was manufactured.

Example 28

First, the same processes as those of (1) and (2) of Example 25 were carried out to produce a honeycomb structural body.

Then, the above-mentioned honeycomb structural body was heated at 500° C. in an oxygen atmosphere for 10 minutes so that a honeycomb filter having a structure in that the rate SP of the area occupied by the sealing material layers to the total area of a cross-section including the through holes in the direction perpendicular to the through holes was 7.4%, with the rate Vβ of organic components being set to 0.50% by weight, was manufactured.

Example 29

(1) The same processes as (1) of Example 25 were carried out to produce a porous ceramic member.

(2) The same processes as (2) of Example 25 were carried out except that a heat resistant sealing material paste, which was composed of 31% by weight of alumina fibers having a fiber length of 0.2 mm, 22% by weight of silicon carbide particles having an average particle size of 0.6 μm, 16% by weight of silica sol, 2% by weight of carboxymethyl cellulose and 29% by weight of water, was used so that a sealing material layer having a thickness of 0.5 mm was formed; thus, a honeycomb structural body was manufactured.

In the honeycomb structural body thus manufactured, the rate of the area occupied by the sealing material layers to the total area of a cross-section including the through holes in the direction perpendicular to the through holes was 3.8%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate $S\beta$ of the area occupied by the sealing material layers to the total area of a cross-section including the through holes in the direction perpendicular to the through holes was 3.8%, with the rate $V\beta$ of organic components being set to 0.05% by weight, was manufactured.

Example 30

First, the same processes as those of (1) and (2) of Example 29 were carried out to produce a honeycomb structural body.

Further, the above-mentioned honeycomb structural body was heated at 600° C. in an oxygen atmosphere for 60 minutes so that a honeycomb filter having a structure, in which the rate $S\beta$ of the area occupied by the sealing material layers to the total area of a cross-section including the through holes in the direction perpendicular to the through holes was 3.8%, with the rate $V\beta$ of organic components being set to 0.10% by weight, was manufactured.

Example 31

First, the same processes as those of (1) and (2) of Example 29 were carried out to produce a honeycomb structural body.

Further, the above-mentioned honeycomb structural body was heated at 500° C. in an oxygen atmosphere for 30 minutes so that a honeycomb filter having a structure, in which the rate $S\beta$ of the area occupied by the sealing material layers to the total area of a cross-section including the through holes in the direction perpendicular to the through holes was 3.8%, with the rate $V\beta$ of organic components being set to 0.20% by weight, was manufactured.

Example 32

First, the same processes as those of (1) and (2) of Example 29 were carried out to produce a honeycomb structural body.

Further, the above-mentioned honeycomb structural body was heated at 500° C. in an oxygen atmosphere for 10 minutes so that a honeycomb filter having a structure, in which the rate $S\beta$ of the area occupied by the sealing material layers to the total area of a cross-section including the through holes in the direction perpendicular to the through holes was 3.8%, with the rate $V\beta$ of organic components being set to 0.50% by weight, was manufactured.

Example 33

(1) The same processes as (1) of Example 25 were carried out to produce a porous ceramic member.

(2) The same processes as (2) of Example 25 were carried out except that a heat resistant sealing material paste, which was composed of 30% by weight of alumina fibers having a fiber length of 0.2 mm, 21% by weight of silicon carbide particles having an average particle size of 0.6 μm, 16% by weight of silica sol, 4% by weight of carboxymethyl cellulose and 29% by weight of water, was used so that a sealing material layer having a thickness of 0.25 mm was formed; thus, a honeycomb structural body was manufactured.

In the honeycomb structural body thus manufactured, the rate of the area occupied by the sealing material layers to the total area of a cross-section including the through holes in the direction perpendicular to the through holes was 2.0%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.05% by weight, was manufactured.

Example 34

First, the same processes as those of (1) and (2) of Example 33 were carried out to produce a honeycomb structural body.

Further, the above-mentioned honeycomb structural body was heated at 600° C. in an oxygen atmosphere for 60 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.10% by weight, was manufactured.

Example 35

First, the same processes as those of (1) and (2) of Example 33 were carried out to produce a honeycomb structural body.

Further, the above-mentioned honeycomb structural body was heated at 500° C. in an oxygen atmosphere for 30 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.20% by weight, was manufactured.

Example 36

First, the same processes as those of (1) and (2) of Example 33 were carried out to produce a honeycomb structural body.

Further, the above-mentioned honeycomb structural body was heated at 500° C. in an oxygen atmosphere for 10 minutes so that a honeycomb filter having a structure, in which the rate $S\beta$ of the area occupied by the sealing material layers to the total area of a cross-section including the through holes in the direction perpendicular to the through holes was 1.9%, with the rate $V\beta$ of organic components being set to 0.50% by weight, was manufactured.

Comparative Example 17

(1) The same processes as (1) of Example 25 were carried out to produce a porous ceramic member.

(2) A number of the porous ceramic members were combined with one another through a method described by reference to FIG. 4 by using the same sealing material paste as the sealing material paste used in (2) of Example 25, and this was cut by using a diamond cutter so that a cylinder-shaped ceramic block, as shown in FIG. 2, was manufactured.

Next, a sealing material paste layer was formed on the circumference of the ceramic block by using the above-mentioned sealing material paste. Then, by drying this sealing material paste layer at 120° C., a cylinder-shaped honeycomb filter having a diameter of 145.8 mm with a thickness of sealing material layers formed between porous ceramic members as well as on the circumference of the ceramic block being set to 1.0 mm, was manufactured, as indicated by the honeycomb filter 20 in FIG. 2.

In the honeycomb filter thus manufactured in Comparative Example 17, the rate Sβ of the area occupied by the sealing material layers to the total area of a cross-section including the through holes in the direction perpendicular to the through holes was 7.4%, and the rate Vβ of organic components to the honeycomb filter was 0.60% by weight.

Comparative Example 18

(1) The same processes as (1) of Example 29 were carried out to produce a porous ceramic member.

(2) The same processes as (2) of Comparative Example 17 were carried out except that the same sealing material paste as the sealing material paste used in (2) of Comparative Example 29 was used with a thickness of the sealing material layer being set to 0.5 mm; thus, a honeycomb filter was manufactured.

In the honeycomb filter thus manufactured in Comparative Example 18, the rate Sβ of the area occupied by the sealing material layers to the total area of a cross-section including the through holes in the direction perpendicular to the through holes was 4.0%, and the rate Vβ of organic components to the honeycomb filter was 0.60% by weight.

Comparative Example 19

(1) The same processes as (1) of Example 33 were carried out to produce a porous ceramic member.

(2) The same processes as (2) of Comparative Example 17 were carried out except that the same sealing material paste as the sealing material paste used in (2) of Comparative Example 33 was used with a thickness of the sealing material layer being set to 0.25 mm; thus, a honeycomb filter was manufactured.

In the honeycomb filter thus manufactured in Comparative Example 19, the rate Sβ of the area occupied by the sealing material layers to the total area of a cross-section including the through holes in the direction perpendicular to the through holes was 2.0%, and the rate Vβ of organic components to the honeycomb filter was 0.60% by weight.

Comparative Example 20

(1) The same processes as (1) of Example 25 were carried out to produce a porous ceramic member.

(2) The same processes as (2) of Example 25 were carried out except that a heat resistant sealing material paste, which was composed of 28% by weight of alumina fibers having a fiber length of 0.2 mm, 20% by weight of silicon carbide particles having an average particle size of 0.6 m, 15% by weight of silica sol, 10% by weight of carboxymethyl cellulose and 27% by weight of water, was used so that a sealing material layer having a thickness of 0.1 mm was formed; thus, a honeycomb structural body was manufactured.

In the honeycomb structural body thus manufactured, the rate of the area occupied by the sealing material layers to the total area of a cross-section including the through holes in the direction perpendicular to the through holes was 0.8%, and the rate of organic components to the honeycomb structural body was 0.60% by weight.

Further, the above-mentioned honeycomb structural body was heated at 700° C. in an oxygen atmosphere for 90 minutes so that a honeycomb filter having a structure, in which the rate Sβ of the area occupied by the sealing material layers to the total area of a cross-section including the through holes in the direction perpendicular to the through holes was 0.8%, with the rate Vβ of organic components being set to 0.05% by weight, was manufactured.

Comparative Example 21

First, the same processes as those of (1) and (2) of Comparative Example 20 were carried out to produce a honeycomb structural body.

Further, the above-mentioned honeycomb structural body was heated at 600° C. in an oxygen atmosphere for 60 minutes so that a honeycomb filter having a structure, in which the rate SP of the area occupied by the sealing material layers to the total area of a cross-section including the through holes in the direction perpendicular to the through holes was 0.8%, with the rate Vβ of organic components being set to 0.10% by weight, was manufactured.

Comparative Example 22

First, the same processes as those of (1) and (2) of Comparative Example 20 were carried out to produce a honeycomb structural body.

Further, the above-mentioned honeycomb structural body was heated at 500° C. in an oxygen atmosphere for 30 minutes so that a honeycomb filter having a structure, in which the rate Sβ of the area occupied by the sealing material layers to the total area of a cross-section including the through holes in the direction perpendicular to the through holes was 0.8%, with the rate Vβ of organic components being set to 0.20% by weight, was manufactured.

Comparative Example 23

First, the same processes as those of (1) and (2) of Example 20 were carried out to produce a honeycomb structural body.

Further, the above-mentioned honeycomb structural body was heated at 500° C. in an oxygen atmosphere for 10 minutes so that a honeycomb filter having a structure, in which the rate Sβ of the area occupied by the sealing material layers to the total area of a cross-section including the through holes in the direction perpendicular to the through holes was 0.8%, with the rate Vβ of organic components being set to 0.50% by weight, was manufactured.

Comparative Example 24

(1) The same processes as (1) of Example 25 were carried out to produce a porous ceramic member.

(2) The same processes as (2) of Comparative Example 17 were carried out except that the same sealing material paste as the sealing material paste used in (2) of Comparative Example 20 was used with a thickness of the sealing material layer being set to 0.1 mm; thus, a honeycomb filter was manufactured.

In the honeycomb filter thus manufactured in Comparative Example 24, the rate $S\beta$ of the area occupied by the sealing material layers to the total area of a cross-section including the through holes in the direction perpendicular to the through holes was 0.8%, and the rate $V\beta$ of organic components to the honeycomb filter was 0.60% by weight.

The same evaluation tests as the evaluation tests 1 and 2, that had been carried out on Examples 1 to 4 and Comparative Example 1, were also carried out on honeycomb filters according to Examples 25 to 36 and Comparative Examples 17 to 24.

The results of these tests are shown in the following Table 9.

TABLE 9

| | | Increasing rate of HC (%) | |
|---|---|---|---|
| | $S\beta$ (%) | $V\beta$ (% by weight) | Evaluation test 1 | Evaluation test 2 |
| Example 25 | 7.4 | 0.05 | 8 | 1 |
| Example 26 | 7.4 | 0.10 | 10 | 2 |
| Example 27 | 7.4 | 0.20 | 12 | 8 |
| Example 28 | 7.4 | 0.50 | 15 | 10 |
| Example 29 | 3.8 | 0.05 | 6 | 1 |
| Example 30 | 3.8 | 0.10 | 8 | 1.5 |
| Example 31 | 3.8 | 0.20 | 10 | 6 |
| Example 32 | 3.8 | 0.50 | 13 | 8 |
| Example 33 | 1.9 | 0.05 | 4 | 0.5 |
| Example 34 | 1.9 | 0.10 | 6 | 1 |
| Example 35 | 1.9 | 0.20 | 8 | 6 |
| Example 36 | 1.9 | 0.50 | 10 | 8 |
| Comparative Example 17 | 7.4 | 0.60 | 40 | 35 |
| Comparative Example 18 | 3.8 | 0.60 | 30 | 25 |
| Comparative Example 19 | 1.9 | 0.60 | 25 | 20 |
| Comparative Example 20 | 0.8 | 0.05 | 0.8 | 0 |
| Comparative Example 21 | 0.8 | 0.10 | 1 | 0 |
| Comparative Example 22 | 0.8 | 0.20 | 3 | 1 |
| Comparative Example 23 | 0.8 | 0.50 | 5 | 3 |
| Comparative Example 24 | 0.8 | 0.60 | 8 | 5 |

As described above, the honeycomb filters according to Examples 25 to 36 and Comparative Examples 17 to 24 have a structure in that sealing material layers are formed between the porous ceramic members as well as on the circumference of the ceramic block, and in each of the honeycomb filters according to Examples 25 to 36 and Comparative Examples 17 to 19, the rate $S\beta$ of the area occupied by the sealing material layers to the total area of a cross-section including the through holes in the direction perpendicular to the through holes is set to 2% or more.

The results of the evaluation test 1 show that in the case of honeycomb filters according to Examples 25 to 36 that have the rate $V\beta$ of organic components is 0.50% by weight or less, the amount of organic components to be discharged from the sealing material layer becomes smaller to cause hardly any increase in HC in the discharged exhaust gases, and the results of the evaluation test 2 show that, when a catalyst is supported on such a honeycomb filter, it becomes possible to effectively reduce the increasing rate of HC to be discharged outside.

In contrast, in the case of honeycomb filters according to Comparative Examples 17 to 19 in which the rate $V\beta$ of organic components exceeds 0.50% by weight, the amount of organic components to be discharged from the sealing material layer becomes greater to cause a very high increasing rate of HC in exhaust gases to be discharged, and the results of the evaluation test 2 indicate that in the case where a catalyst is supported on the honeycomb filter of this type, although the increasing rate of HC to be discharged outside becomes slightly lower, it becomes much greater in comparison with the increasing rate in the honeycomb filters according to Examples 25 to 36.

Moreover, the results of the evaluation test 1 of the honeycomb filters according to Comparative Examples 20 to 24 indicate that, in the case where the rate $S\beta$ of the area occupied by the sealing material layers to the total area of across-section including the through holes in the direction perpendicular to the through holes in the honeycomb filter is less than 2%, the amount of organic components to be discharged from the sealing material layer becomes smaller, even in the case of the rate $V\beta$ of organic components exceeding 0.5% by weight, resulting in hardly any increase in HC in the discharged exhaust gases.

In other words, in the case of the honeycomb filter in which the rate $S\beta$ is less than 2%, even when the rate of organic components contained in the sealing material layer becomes greater, the honeycomb filter is less likely to generate a problem, such as an increase in the amount of HC in exhaust gases to be discharged, as shown in Comparative Examples 17 to 19.

Moreover, the results of the evaluation test 2 indicate that by allowing the honeycomb filter of this type to support a catalyst, it becomes possible to significantly decrease the increasing rate of HC to be discharged outside.

Examples 37 to 39 and Comparative Examples 25 and 26

The same processes as those of Example 1 were carried out except that the thickness of the sealing material layer formed on the circumference of the columnar body was changed as shown in Table 10, thus a honeycomb filter was manufactured.

Examples 40 and 41

Reference Example 1 and Comparative Example 27

The same processes as those of Example 13 were carried out except that the thickness of the sealing material layer formed between the porous ceramic members as well as on the circumference of the ceramic block was changed as shown in Table 11, thus a honeycomb filter was manufactured.

Examples 42 and 43

Reference Example 2 and Comparative Example 28

The same processes as those of Example 25 were carried out except that the thickness of the sealing material layer formed between the porous ceramic members as well as on the circumference of the ceramic block was changed as shown in Table 11, thus a honeycomb filter was manufactured.

(Evaluation Test 3)

With respect to the honeycomb filters manufactured in Examples 1, 13, 25, 37 to 43, Reference Examples 1 and 2 and Comparative Examples 25 to 28, the breaking strength (isostatic strength) was measured when each of the filters was subjected to a cold hydrostatic pressure test. Tables 10 and 11 show the results of the tests.

TABLE 10

|  | Thickness of sealing material layer (mm) | $S\alpha$ (%) | Isostatic strength (kg/cm$^2$) |
| --- | --- | --- | --- |
| Example 1 | 0.5 | 1.38 | 30 |
| Example 37 | 0.3 | 0.83 | 27 |
| Example 38 | 0.2 | 0.55 | 23 |
| Example 39 | 0.17 | 0.47 | 20 |
| Comparative Example 25 | 0.14 | 0.39 | 11 |
| Comparative Example 26 | 0.1 | 0.28 | 8 |

TABLE 11

|  | Thickness of sealing material layer (mm) | | $S\beta$ (%) | Isostatic strength (kg/cm$^2$) |
| --- | --- | --- | --- | --- |
|  | Between porous ceramic members | On the circumference of ceramic block | | |
| Example 13 | 1 | 1 | 7.41 | 35 |
| Example 40 | 0.5 | 0.5 | 3.77 | 33 |
| Example 41 | 0.25 | 0.25 | 1.90 | 30 |
| Reference Example 1 | 0.2 | 0.2 | 1.52 | 25 |
| Comparative Example 27 | 0.1 | 0.1 | 0.76 | 20 |
| Example 25 | 1 | 1 | 7.41 | 34 |
| Example 42 | 0.5 | 0.5 | 3.77 | 33 |
| Example 43 | 0.25 | 0.25 | 1.90 | 29 |
| Reference Example 2 | 0.2 | 0.2 | 1.52 | 24 |
| Comparative Example 28 | 0.1 | 0.1 | 0.76 | 18 |

As shown in Table 10, in the case of the honeycomb filter which has a structure in which: a columnar body made of porous ceramic comprises a number of through holes, the above mentioned through holes being placed in parallel with one another in the length direction with wall portion interposed there between, with a sealing material layer being formed on the circumference thereof, as the rate $S\alpha$ of the area occupied by the sealing material layers to the total area of a cross-section including the through holes in the direction perpendicular to the through holes becomes smaller, the isostatic strength reduces. When the rate $S\alpha$ is 0.5 (0.47) % or more, the necessary isostatic strength is maintained; however, when the rate $S\alpha$ is less than 0.5 (0.47) %, the reduction in the isostatic strength becomes particularly greater, failing to provide sufficient isostatic strength.

Moreover, as shown in Table 11, in the case of a plurality of the honeycomb filters, each having a number of through holes, the above mentioned through holes being placed in parallel with one another in the length direction with partition wall interposed there between, are combined with one another through sealing material layers to form a ceramic block, with a sealing material layer being also formed on the circumference of the ceramic block, as the rate $S\beta$ of the area occupied by the sealing material layers to the total area of a cross-section including the through holes in the direction perpendicular to the through holes becomes smaller, the isostatic strength reduces. When the rate $S\beta$ is 2(1.90) % or more, the necessary isostatic strength is maintained; however, when the rate $S\beta$ is less than 2 (1.90) %, the reduction in the isostatic strength becomes particularly greater, failing to provide sufficient isostatic strength.

INDUSTRIAL APPLICABILITY

Since the honeycomb filter for purifying exhaust gases of the present invention is structured as described above, even when comparatively large sealing material layer is included therein, there is hardly any increase in the amount of organic components contained in exhaust gases to be discharged.

What is claimed is:

1. A method for manufacturing a honeycomb filter for purifying exhaust gas, the method comprising:
providing a columnar body comprising porous ceramic and having a wall portion and a plurality of through holes partitioned by the wall portion, the plurality of through holes extending in a length direction of the columnar body, the wall portion being configured to collect particles in an exhaust gas;
preparing a sealing material comprising an organic binder;
coating the sealing material over a circumferential surface of the columnar body to form a sealing material layer comprising the organic binder in a total weight exceeding 0.5% by weight respect to a total weight of the honeycomb filter, V$\alpha$; and
heating the columnar body having the sealing material layer on the circumferential surface of the columnar body at a temperature sufficient such that the total weight of the organic binder with respect to the total weight of the honeycomb filter, V$\alpha$, becomes 0.5% by weight or less.

2. The method for manufacturing a honeycomb filter for purifying exhaust gas according to claim 1, wherein the heating of the columnar body having the sealing material layer is carried out in an atmosphere containing oxygen.

3. The method for manufacturing a honeycomb filter for purifying exhaust gas according to claim 1, wherein the heating of the columnar body having the sealing material layer is carried out at the temperature in a range of approximately 500° C. to 700° C.

4. The method for manufacturing a honeycomb filter for purifying exhaust gas according to claim 1, wherein the heating of the columnar body having the sealing material layer is carried out at the temperature in a range of approximately 500° C. to 700° C. in an atmosphere containing oxygen.

5. The method for manufacturing a honeycomb filter for purifying exhaust gas according to claim 1, wherein the heating of the columnar body having the sealing material layer is carried out for a duration in a range of about 10 minutes to 90 minutes.

6. The method for manufacturing a honeycomb filter for purifying exhaust gas according to claim 1, wherein the heating of the columnar body having the sealing material layer is carried out such that a total cross-section area of the sealing material layer with respect to a total cross-section area of the honeycomb filter, S$\alpha$, remains 0.5% or more.

7. A method for manufacturing a honeycomb filter for purifying exhaust gas, the method comprising:
- providing a plurality of columnar porous ceramic members each having a wall portion and a plurality of through holes partitioned by the wall portion, the plurality of through holes extending in a length direction of each of the columnar porous ceramic members, the wall portion being configured to collect particles in an exhaust gas;
- preparing an inner sealing material comprising an organic binder;
- assembling the plurality of columnar porous ceramic members with the inner sealing material into a ceramic block comprising the plurality of columnar porous ceramic members combined through an inner sealing material layer comprising the inner sealing material;
- preparing an outer sealing material comprising an organic binder;
- coating the outer sealing material over a circumferential surface of the ceramic block to form an outer sealing material layer comprising the outer sealing material such that in a total weight of the organic binders in the inner sealing layer and outer sealing layer exceeds 0.5% by weight respect to a total weight of the honeycomb filter, $V\alpha$; and
- heating the ceramic block having the outer sealing material layer on the circumferential surface of the ceramic block at a temperature sufficient such that the total weight of the organic binders in the inner sealing layer and outer sealing layer with respect to the total weight of the honeycomb filter, $V\alpha$, becomes 0.5% by weight or less.

8. The method for manufacturing a honeycomb filter for purifying exhaust gas according to claim 7, wherein the heating of the ceramic block having the outer sealing material layer is carried out in an atmosphere containing oxygen.

9. The method for manufacturing a honeycomb filter for purifying exhaust gas according to claim 7, wherein the heating of the ceramic block having the outer sealing material layer is carried out at the temperature in a range of approximately 500° C. to 700° C.

10. The method for manufacturing a honeycomb filter for purifying exhaust gas according to claim 7, wherein the heating of the ceramic block having the outer sealing material layer is carried out at the temperature in a range of approximately 500° C. to 700° C. in an atmosphere containing oxygen.

11. The method for manufacturing a honeycomb filter for purifying exhaust gas according to claim 7, wherein the heating of the ceramic block having the outer sealing material layer is carried out for a duration in a range of about 10 minutes to 90 minutes.

12. The method for manufacturing a honeycomb filter for purifying exhaust gas according to claim 7, wherein the heating of the ceramic block having the outer sealing material layer is carried out such that a total cross-section area of the outer sealing material layer with respect to a total cross-section area of the honeycomb filter, $S\alpha$, remains 0.5% or more.

13. The method of claim 1, wherein said heating is performed at a temperature greater than a temperature for drying and solidifying the sealing material to form the sealing material layer.

14. The method of claim 1, wherein said heating is performed at thermal conditions, including a predetermined temperature and time, which cause decomposition and removal of organic components from the formed sealing material layer.

15. The method of claim 13, wherein said temperature for drying and solidifying is 50-100° C., said heating being performed at a temperature greater than 100° C.

16. The method of claim 7, wherein said heating is performed at a temperature greater than a temperature for drying and solidifying the sealing material to form the sealing material layer.

17. The method of claim 7, wherein said heating is performed at thermal conditions, including a predetermined temperature and time, which cause decomposition and removal of organic components from the formed sealing material layer.

18. The method of claim 16, wherein said temperature for drying and solidifying is 50-100° C., said heating being performed at a temperature greater than 100° C.

19. The method of claim 1, wherein the preparing comprises drying the sealing material.

20. The method of claim 7, wherein the preparing of the inner sealing material comprises drying the inner sealing material, and the preparing of the outer sealing material comprises drying the outer sealing material.

* * * * *